(12) United States Patent
Tamrakar et al.

(10) Patent No.: US 10,735,158 B2
(45) Date of Patent: Aug. 4, 2020

(54) REFERENCE SIGNAL MAPPING METHOD AND DEVICE

(71) Applicant: CHINA ACADEMY OF TELECOMMUNICATIONS TECHNOLOGY, Beijing (CN)

(72) Inventors: Rakesh Tamrakar, Beijing (CN); Qiubin Gao, Beijing (CN); Runhua Chen, Beijing (CN); Wenhong Chen, Beijing (CN); Hui Li, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 140 days.

(21) Appl. No.: 15/747,753

(22) PCT Filed: Jun. 20, 2016

(86) PCT No.: PCT/CN2016/086430
§ 371 (c)(1),
(2) Date: Jan. 25, 2018

(87) PCT Pub. No.: WO2017/016341
PCT Pub. Date: Feb. 2, 2017

(65) Prior Publication Data
US 2018/0227095 A1 Aug. 9, 2018

(30) Foreign Application Priority Data
Jul. 27, 2015 (CN) .......................... 2015 1 0447065

(51) Int. Cl.
*H04L 5/00* (2006.01)
*H04W 72/04* (2009.01)

(52) U.S. Cl.
CPC ............ *H04L 5/0048* (2013.01); *H04L 5/005* (2013.01); *H04L 5/0053* (2013.01);
(Continued)

(58) Field of Classification Search
CPC ....................... H04L 5/0048; H04L 5/0053
See application file for complete search history.

(56) References Cited

U.S. PATENT DOCUMENTS

2011/0249767 A1* 10/2011 Chen ................... H04L 5/0023
375/295
2011/0292847 A1 12/2011 Yoon et al.
(Continued)

FOREIGN PATENT DOCUMENTS

| CN | 103179664 A | 6/2013 |
| CN | 104604170 A | 5/2015 |

(Continued)

OTHER PUBLICATIONS

International Preliminary Report on Patentability (IPRP; Ch. 1) for PCT/CN2016/086430 dated Feb. 8, 2018 and its English translation provided by WIPO.
(Continued)

*Primary Examiner* — Zhiren Qin
(74) *Attorney, Agent, or Firm* — Ladas & Parry, LLP

(57) ABSTRACT

A reference signal mapping method and a reference signal mapping device are provided. The reference signal mapping method includes steps of: determining a position of a RE to which a CSI-RS has been mapped in accordance with an N-port reference signal pattern, N being equal to 12 or 16; and performing a resource mapping operation on the CSI-RS in accordance with the determined position of the RE. The position of the RE to which the CSI-RS has been mapped in the N-port reference signal pattern being determined in accordance with a position of the RE to which the CSI-RS has been mapped in one or more of a 2-port reference signal pattern, a 4-port reference signal pattern and an 8-port reference signal pattern. As a result, it is able to achieve the 12-port or 16-port CSI-RS mapping, thereby to achieve the 12-port or 16-port CSI-RS transmission.

16 Claims, 11 Drawing Sheets

(52) U.S. Cl.
CPC .......... *H04L 5/0082* (2013.01); *H04W 72/04* (2013.01); *H04L 5/0007* (2013.01)

(56) References Cited

U.S. PATENT DOCUMENTS

| | | | |
|---|---|---|---|
| 2013/0215823 A1* | 8/2013 | Shin | H04L 5/001 370/328 |
| 2014/0211730 A1* | 7/2014 | Seo | H04L 5/0053 370/329 |
| 2014/0355408 A1 | 12/2014 | Tong et al. | |
| 2015/0010106 A1 | 1/2015 | Skov et al. | |
| 2015/0318972 A1* | 11/2015 | Zhang | H04L 5/0057 370/329 |
| 2016/0050153 A1 | 2/2016 | Xu et al. | |
| 2016/0242060 A1 | 8/2016 | Kakishima et al. | |
| 2016/0248562 A1* | 8/2016 | Nam | H04L 27/2601 |
| 2016/0337178 A1* | 11/2016 | Frenne | H04L 41/0803 |
| 2018/0034613 A1* | 2/2018 | Liu | H04W 72/04 |
| 2018/0115357 A1* | 4/2018 | Park | H04L 5/0051 |
| 2018/0167122 A1* | 6/2018 | Gao | H04L 25/0228 |
| 2018/0183556 A1* | 6/2018 | Shin | H04L 5/0051 |
| 2018/0198510 A1* | 7/2018 | Park | H04B 7/0417 |

FOREIGN PATENT DOCUMENTS

| | | |
|---|---|---|
| JP | 2013535128 A | 9/2013 |
| JP | 2015070335 A | 4/2015 |
| JP | 2015510316 A | 4/2015 |
| WO | 2013110219 A1 | 8/2013 |
| WO | 2014/042422 A2 | 3/2014 |
| WO | 2014/051374 A1 | 4/2014 |
| WO | 2014051374 A1 | 4/2014 |
| WO | 2014110837 A1 | 7/2014 |
| WO | 2014166052 A1 | 10/2014 |

OTHER PUBLICATIONS

Written Opinion of the International Search Authority for PCT/CN2016/086430 dated Aug. 30, 2016 and its English translation provided by WIPO.
From EPO Application No. 16829708.3, Extended European Search Report and Search Opinion dated Jun. 18, 2018.
R1-152656—Fujitsu, "Discussion on Non-Precoded CSI-RS-Based Scheme for EBF/FD-MIMO"; 3GPP TSG RAN WG1 Meeting #81; Fukuoka, Japan; May 25-29, 2015; pp. 1-6.
"Potential enhancements on non-precoded CSI-RS and CSI measurement", 3GPP TSG RAN WG1 Meeting #81, Fukuoka, Japan, May 25-29, 2015.
"Discussion on CSI-RS mapping for non-precoded CSI-RS based schemes", 3GPP TSG RAN WG1 Meeting #81, Fukuoka, Japan, May 25-29, 2015.
"Transmission of non-precoded CSI-RS", 3GPP TSG RAN WG1 Meeting #82, Beijing, China, Aug. 24-28, 2015.
"Discussion on Non-precoded CSI-RS enhancement in FD-MIMO", 3GPP TSG RAN WG1 Meeting #82, Beijing, China, Aug. 24-28, 2015.
Notification of Reasons for Refusal from JP app. No. 2018504091, dated Jan. 22, 2019, with machine English translation from JPO.
International Search Report for PCT/CN2016/086430 dated Aug. 30, 2016 and its English translation provided by WIPO.
Written Opinion of the International Search Authority for PCT/CN2016/086430 dated Aug. 30, 2016 and its English translation provided by Google Translate.
Samsung, "New WID Proposal: Elevation Beamforming/Full-Dimension (FD) MIMO for LTE" 3GPP TSG Ran Meeting #68 RP-151085, Jun. 18, 2015.
3GPP TS 36.211, $3^{rd}$ Generation Partnership Project; Technical Specification Group Radio Access Network; Evolved Universal Terrestrial Radio Access (E-UTRA); Physical Channels and Modulation (Release 12), V12.6.0 (Jun. 2015), pp. 1-151.
Notification of Reason for Refusal from KR app. No. 2018-7004406, dated Jul. 2, 2019, with English translation from KIPO.

* cited by examiner

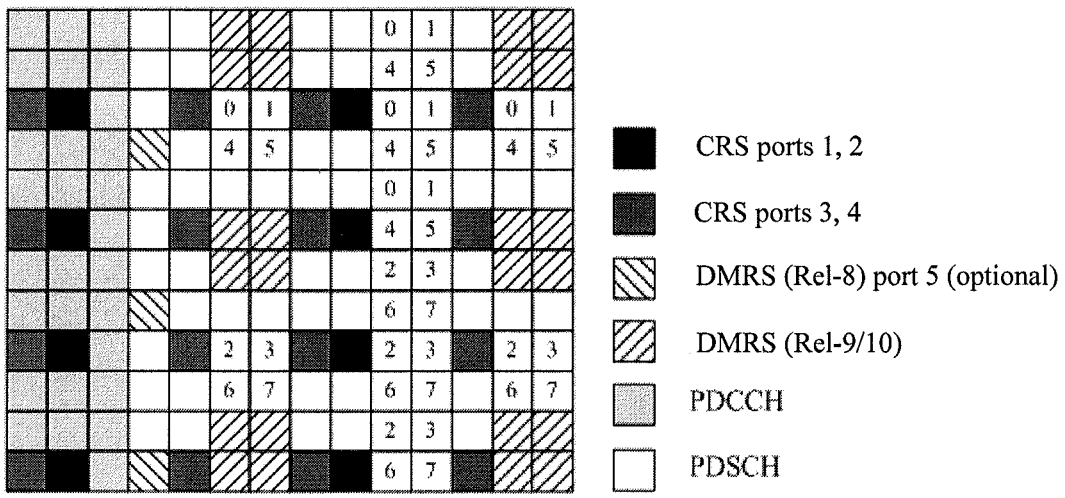

Fig.1C

```
┌──────────────────────────────────────────────────────────────────────┐         201
│   determining a position of a RE to which a CSI-RS has been mapped in│      ┌─
│ accordance with an N-port reference signal pattern, N being equal to 12 or 16, the │
│ position of the RE to which the CSI-RS has been mapped in the N-port reference │
│ signal pattern being determined in accordance with a position of the RE to which │
│  the CSI-RS has been mapped in one or more of a 2-port reference signal pattern, │
│       a 4-port reference signal pattern and an 8-port reference signal pattern  │
└──────────────────────────────────────────────────────────────────────┘
                                    │
                                    ▼
┌──────────────────────────────────────────────────────────────────────┐         202
│                                                                      │      ┌─
│ performing a resource mapping operation on the CSI-RS in accordance with the │
│                       determined position of the RE                  │
└──────────────────────────────────────────────────────────────────────┘
```

Fig.2

REFERENCE SIGNAL MAPPING METHOD AND DEVICE

CROSS-REFERENCE TO RELATED APPLICATIONS

The present application is the U.S. national phase PCT Application No. PCT/CN2016/086430 filed on Jun. 20, 2016, which claims priority to Chinese patent application No. 201510447065.5 filed on Jul. 27, 2015, the disclosures of which are incorporated herein by reference in their entireties.

TECHNICAL FIELD

The present disclosure relates to the field of wireless communication technology, in particular to a reference signal mapping method and a reference signal mapping device.

BACKGROUND

In a Release 10 (Rel-10) Long Term Evolution (LTE) system, for downlink transmission, five reference signals have been defined, i.e., Cell-specific Reference Signal (C-RS), User Equipment-specific Reference Signal (UE-RS, also called as Demodulation-Reference Signal (DM-RS)), Multimedia Broadcast multicast service Single Frequency Network (MBSFN) reference signal, Positioning-Reference Signal (P-RS), and Channel State Information Reference Signal (CRI-RS). The CSI-RS is used for downlink channel measurement and estimation.

FIGS. 1A, 1B and 1C show reference signal patterns supporting the CSI-RS in the LTE system respectively. The reference signal patterns show positions of resources for different reference signals, i.e., positions of Resource Element (REs), to which the different reference signals are mapped, in a Physical Resource Block (PRB).

One reference signal is transmitted through each downlink antenna port. One PRB includes 20 2-port reference signal patterns (as shown in FIG. 1A), 10 4-port reference signal patterns (as shown in FIG. 1B), and 5 8-port reference signal patterns (as shown in FIG. 1C).

As shown in FIGS. 1A, 1B and 1C, the current LTE system may configure 2 ports, 4 ports or 8 ports for the CSI-RS, but it is impossible for the LTE system to support the CSI-RS with more ports.

SUMMARY

(1) Technical Problem to be Solved

An object of the present disclosure is to provide a reference signal mapping method and a reference signal mapping device, so as to achieve 12-port or 16-port CSI-RS mapping.

(2) Technical Solution

In one aspect, the present disclosure provides in some embodiments a reference signal mapping method, including steps of: determining a position of a RE to which a CSI-RS has been mapped in accordance with an N-port reference signal pattern, N being equal to 12 or 16, the position of the RE to which the CSI-RS has been mapped in the N-port reference signal pattern being determined in accordance with a position of the RE to which the CSI-RS has been mapped in one or more of a 2-port reference signal pattern, a 4-port reference signal pattern and an 8-port reference signal pattern; and performing a resource mapping operation on the CSI-RS in accordance with the determined position of the RE.

In another aspect, the present disclosure provides in some embodiments a reference signal mapping device, including: a determination module configured to determining a position of a RE to which a CSI-RS has been mapped in accordance with an N-port reference signal pattern, N being equal to 12 or 16, the position of the RE to which the CSI-RS has been mapped in the N-port reference signal pattern being determined in accordance with a position of the RE to which the CSI-RS has been mapped in one or more of a 2-port reference signal pattern, a 4-port reference signal pattern and an 8-port reference signal pattern; and a mapping module configured to perform a resource mapping operation on the CSI-RS in accordance with the determined position of the RE.

In yet another aspect, the present disclosure provides in some embodiments a network side device, including a processor, a memory connected to the processor through a bus interface and configured to store therein programs and data for the operation of the processor, and a transceiver configured to communicate with any other devices over a transmission medium. The processor is configured to call and execute the programs and data stored in the memory, so as to enable the network side device to: determine a position of a RE to which a CSI-RS has been mapped in accordance with an N-port reference signal pattern, N being equal to 12 or 16, the position of the RE to which the CSI-RS has been mapped in the N-port reference signal pattern being determined in accordance with a position of the RE to which the CSI-RS has been mapped in one or more of a 2-port reference signal pattern, a 4-port reference signal pattern and an 8-port reference signal pattern; and perform a resource mapping operation on the CSI-RS in accordance with the determined position of the RE.

(3) Beneficial Effect

According to the embodiments of the present disclosure, the 12-port or 16-port reference signal pattern is acquired in accordance with one or more of the known reference signal patterns, e.g., the 2-port reference signal pattern, 4-port reference signal pattern and 8-port reference signal pattern, the position of the RE to which the CSI-RS has been mapped is determined in accordance with the 12-port or 16-port reference signal pattern, and then the resource mapping operation is performed on the CSI-RS in accordance with the position of the RE. As a result, it is able to achieve the 12-port or 16-port CSI-RS mapping, thereby to achieve the 12-port or 16-port CSI-RS transmission.

BRIEF DESCRIPTION OF THE DRAWINGS

In order to illustrate the technical solutions of the present disclosure or the prior art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

FIGS. 1A, 1B and 1C are schematic views showing 2-port reference signal pattern, 4-port reference signal pattern and 8-port reference signal pattern in the prior art;

FIG. 2 is a flow chart of a reference signal mapping method according to one embodiment of the present disclosure;

DETAILED DESCRIPTION OF THE EMBODIMENTS

Figure 1A:
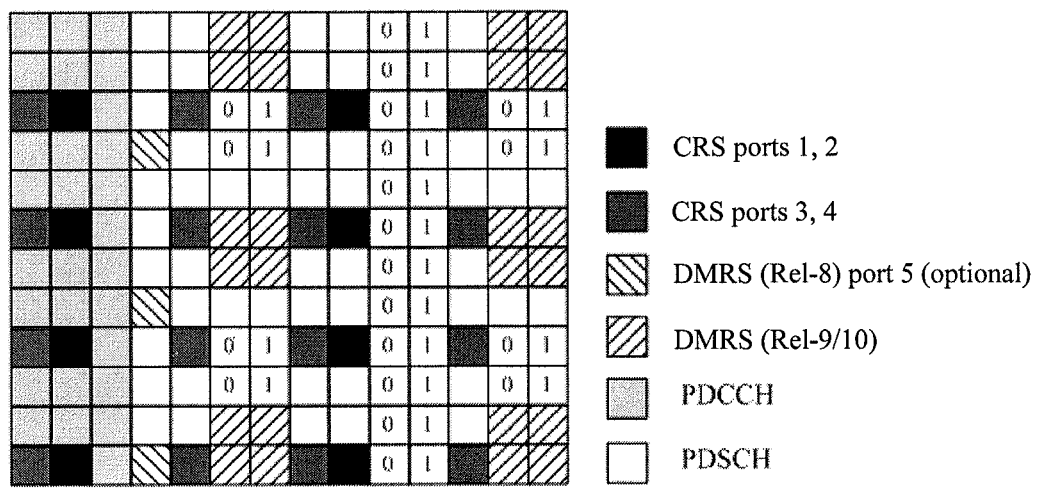

The present disclosure will be described hereinafter in conjunction with the drawings and embodiments. The following embodiments are for illustrative purposes only, but shall not be used to limit the scope of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

In the following, the technical solutions of the present disclosure will be described hereinafter in a clear and complete manner in conjunction with the drawings. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

One respective reference signal is transmitted through each downlink antenna port. The antenna port refers to a logic port for data transmission, and it may correspond to one or more physical antennae. The antenna port is defined depending on a receiver, i.e., in the case that the receiver needs to differentiate resources in space, it is necessary to define a plurality of antenna ports. For a UE, a correspondence antenna port is defined by a received reference signal corresponding to the antenna port, although the reference signal may be combined by a plurality of signals transmitted through a plurality of physical antennae.

Referring to FIG. 2, the present disclosure provides in some embodiments a reference signal mapping method which may be implemented by a base station and include: Step 201 of determining a position of a RE to which a CSI-RS has been mapped in accordance with an N-port reference signal pattern, N being equal to 12 or 16, the position of the RE to which the CSI-RS has been mapped in the N-port reference signal pattern being determined in accordance with a position of the RE to which the CSI-RS has been mapped in one or more of a 2-port reference signal pattern, a 4-port reference signal pattern and an 8-port reference signal pattern; and Step 202 of performing a resource mapping operation on the CSI-RS in accordance with the determined position of the RE.

According to the embodiments of the present disclosure, the 12-port reference signal pattern is generated using one or more of the 2-port reference signal pattern, 4-port reference signal pattern and 8-port reference signal pattern, and then the CSI-RS mapping operation is performed in accordance with the 12-port reference signal pattern, so as to achieve the 12-port CSI-RS transmission. Similarly, the 16-port reference signal pattern is generated using one or more of the 2-port reference signal pattern, 4-port reference signal pattern and 8-port reference signal pattern, and then the CSI-RS mapping operation is performed in accordance with the 16-port reference signal pattern, so as to achieve the 16-port CSI-RS transmission.

Through the above-mentioned method, in the case that the base station includes 12, 16 or more antenna ports, the base station may configure a 12-port CSI-RS or 16-port CSI-RS for a UE. Then, the UE may measure a channel and return channel information through the configured CSI-RS port.

In the N-port reference signal pattern, N is equal to 12 or 16, i.e., its value is relatively large. In order to simplify the design, preferably, the 12-port reference signal pattern and/or the 16-port reference signal pattern may be designed at least in accordance with the 8-port reference signal pattern. In other words, positions of at least a part of N REs to which a group of CSI-RSs have been mapped in the N-port reference signal pattern may be identical to positions of the REs to which one or more groups of CSI-RS have been mapped in the 8-port reference signal pattern. Of course, in the embodiments of the present disclosure, the 12-port or 16-port reference signal pattern may also be designed in accordance with various combinations of the 2-port reference signal pattern, 4-port reference signal pattern and 8-port reference signal pattern.

(1) 12-Port Reference Signal Pattern

Preferably, in a possible embodiment of the present disclosure, positions of eight REs of twelve REs to which a group of CSI-RSs have been mapped in the 12-port reference signal pattern may be identical to positions of eight REs to which a first group of CSI-RSs have been mapped in the 8-port reference signal pattern. Further, the remaining four REs may be distributed in any one of the following five modes.

Figure 1B:
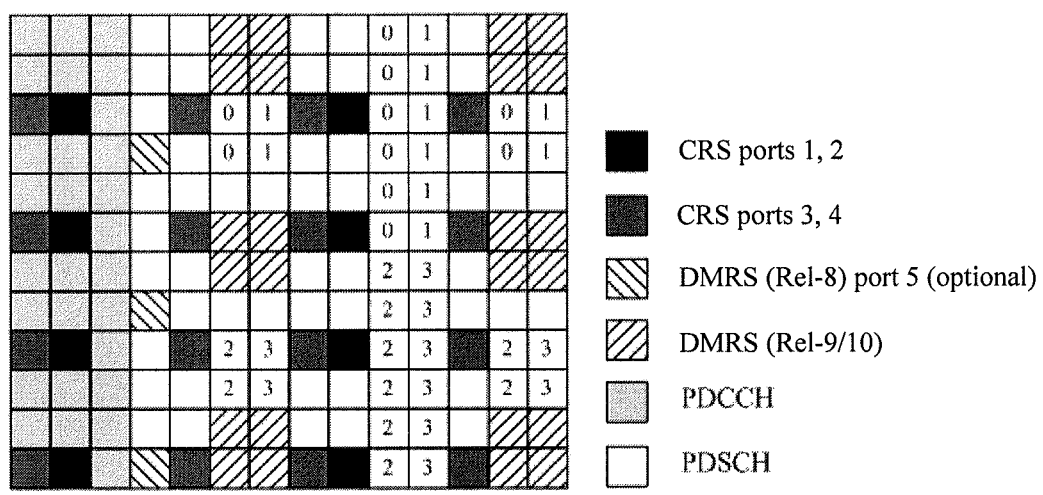

In a first distribution mode, the remaining four REs may be located at positions identical to four REs to which a group of CSI-RSs have been mapped in the 4-port reference signal pattern. For example, REs to which a group of 8-port CSI-RSs have been mapped may be randomly selected from the pattern as shown in FIG. 1C, and REs to which a group of 4-port CSI-RSs have been mapped may be randomly selected from the pattern as shown in FIG. 1B, on the premise that the selected REs to which the 8-port CSI-RSs have been mapped do not overlap the selected REs to which the 4-port CSI-RSs have been mapped. Then, a 12-port reference signal pattern for a group of 12-port CSI-RSs may be acquired in accordance with the positions of these REs.

In a second distribution mode, the remaining four REs may be REs to which no reference signal has been mapped in the 8-port reference signal pattern. For example, the mapping pattern in FIG. 1C for four groups of 8-port CSI-RSs may be reserved, and the REs corresponding to the other ports may be selected from the REs to which no reference signal has been mapped, so as to acquire the 12-port reference signal pattern.

In a third distribution mode, the remaining four REs may be located at positions identical to four of the REs to which a second group of CSI-RSs have been mapped in the 8-port reference signal pattern.

In a fourth distribution mode, two of the remaining four REs may be located at positions identical to two of eight REs to which the second group of CSI-RSs have been mapped in the 8-port reference signal pattern, and the other two of the remaining four REs may be located at positions identical to two of eight REs to which a third group of CSI-RSs have been mapped in the 8-port reference signal pattern.

In a fifth distribution mode, two of the remaining four REs may be located at positions identical to two of the eight REs to which the second group of CSI-RS have been mapped in the 8-port reference signal pattern, and the other two of the remaining four REs may be REs to which no reference signal has been mapped in the 8-port reference signal pattern.

It should be appreciated that, in the above-mentioned first to fifth distribution modes, each of the so-called "first group of CSI-RSs", "second group of CSI-RSs", and "third group of CSI-RSs" does not specifically refer to a certain group of CSI-RSs, and it merely used to differentiate itself from other groups.

Preferably, in another possible embodiment of the present disclosure, positions of four REs of the twelve REs to which a group of CSI-RSs have been mapped in the 12-port reference signal pattern may be identical to positions of four of the eight REs to which the first group of CSI-RSs have been mapped in the 8-port reference signal pattern, and the remaining eight REs may be distributed in any one of the following four modes.

In a sixth distribution mode, four of the remaining eight REs may be located at positions identical to four of the eight REs to which the second group of CSI-RSs have been mapped in the 8-port reference signal pattern, two of the remaining four REs may be located at positions identical to two of the eight REs to which the third group of CSI-RSs have been mapped in the 8-port reference signal pattern, and the other two of the remaining four REs may be REs to which no reference signal has been mapped in the 8-port reference signal pattern.

In a seventh distribution mode, four of the remaining eight REs may be located at positions identical to four of the eight REs to which the second group of CSI-RSs have been mapped in the 8-port reference signal pattern, and the other four of the remaining eight REs may be located at positions identical to four of the eight REs to which the third group of CSI-RSs have been mapped in the 8-port reference signal pattern.

In an eighth distribution mode, four of the remaining eight REs may be located at positions identical to four of the eight REs to which the second group of CSI-RSs have been mapped in the 8-port reference signal pattern, and the other four of the remaining eight REs may be REs to which no reference signal has been mapped in the 8-port reference signal pattern.

In a ninth distribution mode, the remaining eight REs may be REs to which no reference signal has been mapped in the 8-port reference signal pattern.

It should be also appreciated that, in the above-mentioned sixth to ninth distribution modes, each of the so-called "first group of CSI-RSs", "second group of CSI-RSs" and "third group of CSI-RSs" does not specifically refer to a certain group of CSI-RSs, and it is merely used to differentiate itself from other groups of CSI-RSs.

In the embodiments of the present disclosure, the N REs to which a group of CSI-RSs have been mapped in the 12-port reference signal pattern may be located in an identical column of symbols or in different columns of symbols, and each column of symbols may contain two adjacent symbols. Further, in the case that the N REs to which a group of CSI-RSs have been mapped are located in different columns of symbols, they may be located in two or three columns of symbols. In the 12-port reference signal pattern, the CSI-RSs may be mapped to three columns of symbols. In the embodiments of the present disclosure, in the case that a group of 12-port CSI-RSs are mapped to two columns of symbols, they may be mapped to any two of the three columns of symbols, which will not be particularly defined herein.

Preferably, in the case that no DM-RS is to be transmitted, a part of the N REs to which a group of CSI-RSs have been mapped may be mapped to a position of a RE to which the DM-RS has been mapped in accordance with the 12-port reference signal pattern. In this way, it is able to make full use of physical resources, so as to transmit the CSI-RSs.

In the possible embodiment of the present disclosure, among 12 ports corresponding to a group of CSI-RSs in the 12-port reference signal pattern, at least two ports may be multiplexed using a 2-bit orthogonal complementary code, or at least four ports may be multiplexed using a 4-bit orthogonal complementary code, or at least six ports may be multiplexed using a 6-bit orthogonal complementary code. Preferably, the ports may be selected and multiplexed randomly. Preferably, in the 12-port reference signal pattern, every two ports are multiplexed using a 2-bit orthogonal complementary code, or every four ports are multiplexed using a 4-bit orthogonal complementary code, or every 6 ports are multiplexed using a 6-bit orthogonal complementary code.

Preferably, in the 12-port reference signal pattern, the number of bits of an orthogonal complementary code used by N ports corresponding to the first group of CSI-RSs may be identical to or different from the number of bits of an orthogonal complementary code used by N ports corresponding to the second group of CSI-RSs. Here, each of the so-called "first group of CSI-RSs" and "second group of CSI-RSs" does not specifically refer to a certain group of CSI-RSs, and it is merely used to differentiate itself from the other groups of CSI-RSs.

Further, the 12-port reference signal pattern may include a 12-port reference signal pattern with a DwPTS. In this way, it is able to map and transmit the CSI-RSs in the DwPTS in accordance with the 12-port reference signal pattern with the DwPTS.

(2) 16-Port Reference Signal Pattern

Preferably, positions of eight REs of sixteen REs to which a group of CSI-RSs have been mapped in the 16-port reference signal pattern may be identical to the positions of the eight REs to which the first group of CSI-RSs have been mapped in the 8-port reference signal pattern, and positions of the remaining eight REs may be identical to the positions of the eight REs to which the second group of CSI-RSs have been mapped in the 8-port reference signal pattern. For example, one method for forming the 16-port CSI-RS pattern may include combining two 8-port CSI-RS patterns directly.

In the embodiments of the present disclosure, the N REs to which a group of CSI-RSs have been mapped in the 16-port reference signal pattern may be located in an identical column of symbols or in different columns of symbols, and each column of symbols may contain two adjacent symbols. Further, in the case that the N REs to which a group of CSI-RSs have been mapped are located in different columns of symbols, they may be located in two or three columns of symbols. In the 16-port reference signal pattern, the CSI-RSs may be mapped to three columns of symbols. In the embodiments of the present disclosure, in the case that a group of 16-port CSI-RSs are mapped to two columns of symbols, they may be mapped to any two of the three columns of symbols, which will not be particularly defined herein.

Preferably, in the case that no DM-RS is to be transmitted, a part of the N REs to which a group of CSI-RSs have been mapped may be mapped to a position of a RE to which the DM-RS has been mapped in accordance with the 16-port reference signal pattern. In this way, it is able to make full use of physical resources, so as to transmit the CSI-RSs.

In 16 ports corresponding to a group of CSI-RSs in the 16-port reference signal pattern, at least two ports may be multiplexed using a 2-bit orthogonal complementary code, or at least four ports may be multiplexed using a 4-bit orthogonal complementary code, or at least six ports may be multiplexed using a 6-bit orthogonal complementary code. Preferably, the ports may be selected and multiplexed randomly. Preferably, in the 16-port reference signal pattern, every two ports of the 16 ports corresponding to a group of CSI-RSs are multiplexed using a 2-bit orthogonal complementary code, or every four ports of the 16 ports corresponding to a group of CSI-RSs are multiplexed using a 4-bit orthogonal complementary code.

Preferably, in the 16-port reference signal pattern, the number of bits of an orthogonal complementary code used by N ports corresponding to the first group of CSI-RSs may be identical to or different from the number of bits of an orthogonal complementary code used by N ports corresponding to the second group of CSI-RSs. Here, each of the so-called "first group of CSI-RSs" and "second group of CSI-RSs" does not specifically refer to a certain group of CSI-RSs, and it is merely used to differentiate itself from the other group of CSI-RSs.

Further, the 16-port reference signal pattern may include a 16-port reference signal pattern with a DwPTS. In this way, it is able to map and transmit the CSI-RSs in the DwPTS in accordance with the 16-port reference signal pattern with the DwPTS.

The 12-port and 16-port reference signal patterns will be described hereinafter in more details in conjunction with the following first to fifth embodiments.

First Embodiment

In this embodiment, a scheme for acquiring the 12-port reference signal pattern in accordance with the 4-port and 8-port reference signal patterns will be described.

Figure 3A:
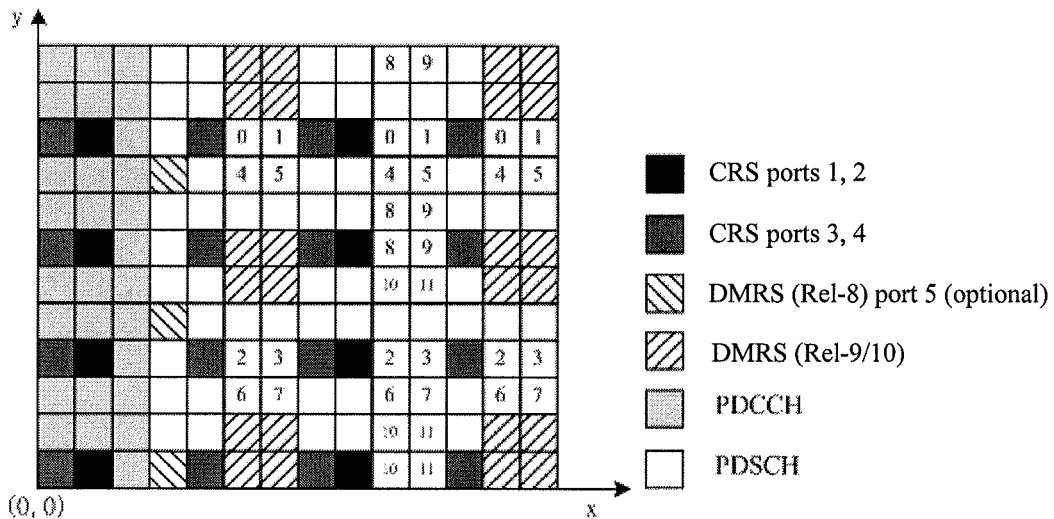
FIGS. 3A, 3B and 3C are schematic views showing a 12-port reference signal pattern according to the first embodiment of the present disclosure.

FIG. 3A shows a 12-port reference signal pattern. It should be appreciated that, FIG. 3A merely shows a possible 12-port reference signal pattern, and based on the above-mentioned distribution modes of the 12-port reference signal patterns, it is able to acquire the other 12-port reference signal patterns, which will not be particularly defined herein.

To facilitate the description, in FIG. 3A, each box may represent one RE, and a position of each RE may be represented by coordinates (x,y), where x represents a symbol number and y represents a subcarrier number. A numeric value in each box represents a port number.

As shown in FIG. 3A, the patterns for three groups of 12-port CSI-RSs are provided.

The REs to which the first group of CSI-RSs have been mapped are located, depending on an order of the port number from 0 to 11, at the positions (5,9), (6,9), (5,3), (6,3), (5,8), (6,8), (5,2), (6,2), (9,7), (10,7), (9,1) and (10,1). The REs corresponding to the ports 0 to 7 are located at the positions identical to the REs to which a group of 8-port CSI-RSs have been mapped in FIG. 1C, and the REs corresponding to the ports 8 to 11 are located at the positions identical to the REs to which a group of CSI-RSs have been mapped in FIG. 1B.

The REs to which the second group of CSI-RSs have been mapped are located, depending on an order of the port number from 0 to 11, at the positions (9,9), (10,9), (9,3), (10,3), (9,8), (10,8), (9,2), (10,2), (9,6), (10,6), (9,0) and (10,0). The REs corresponding to the ports 0 to 7 are located at the positions identical to the REs to which a group of CSI-RSs have been mapped in FIG. 1C, and the REs corresponding to the ports 8 to 11 are located at the positions identical to the REs to which a group of CSI-RSs have been mapped in FIG. 1B.

The REs to which the third group of CSI-RSs have been mapped are located, depending on an order of the port number from 0 to 11, at the positions (12,9), (13,9), (12,3), (13,3), (12,8), (13,8), (12,2), (13,2), (9,11), (10,11), (9,5) and (10,5). The REs corresponding to the ports 0 to 7 are located at the positions identical to the REs to which a group of CSI-RSs have been mapped in FIG. 1C, and the REs corresponding to the ports 8 to 11 are located at the positions identical to the REs to which a group of CSI-RSs have been mapped in FIG. 1B.

In this embodiment, it is also able to acquire the 12-port reference signal pilot pattern in a DwPTS region of a Time Division Duplexing (TDD) subframe on the basis of the above-mentioned principle.

Figure 3B:
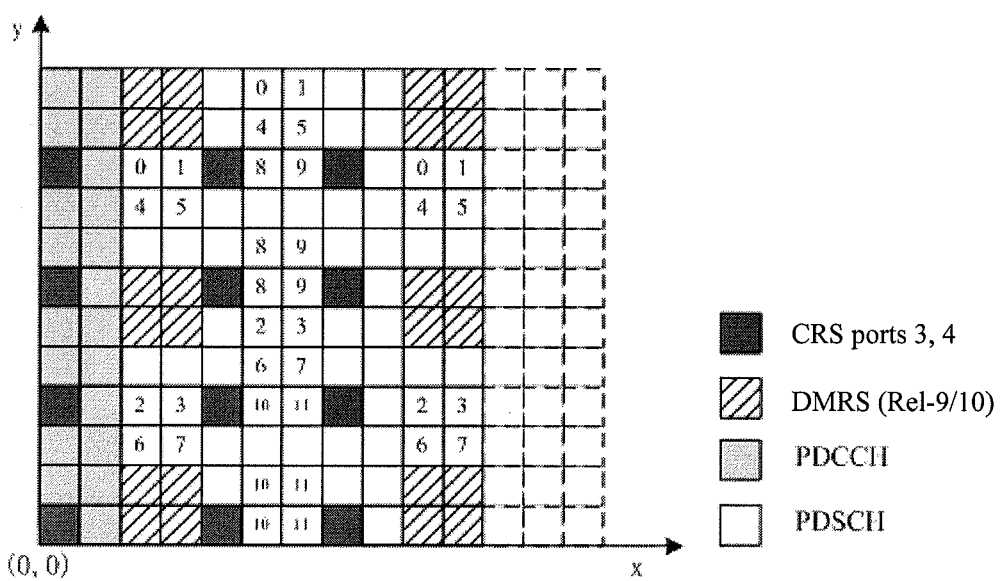
Figure 3C:
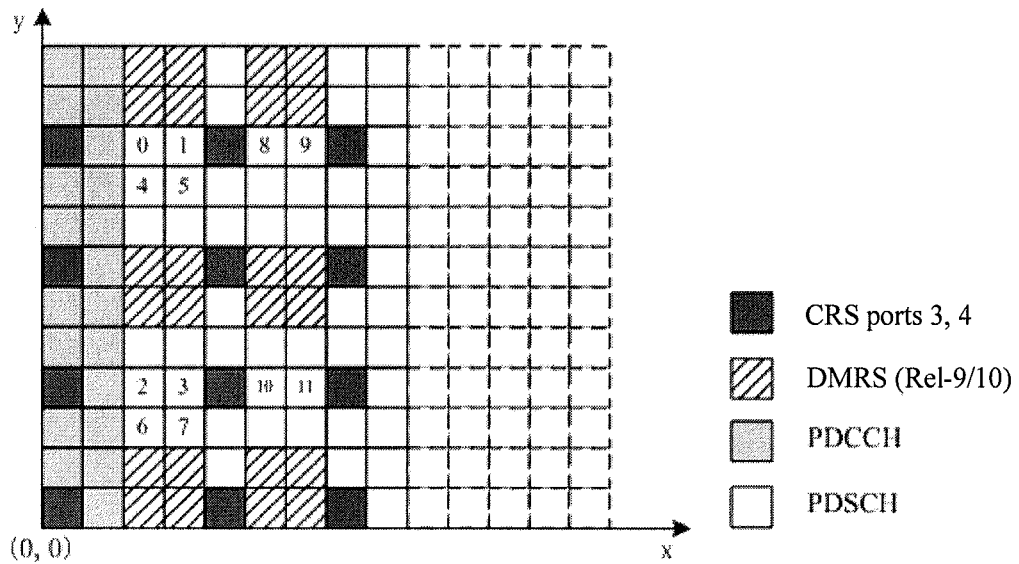

FIGS. 3B and 3C show 12-port reference signal patterns in DwPTSs respectively. The pattern in FIG. 3B may be adapted to a DwPTS having a length of 11 or 12 symbols, while the pattern in FIG. 3C may be adapted to a DwPTS having a length of 9 or 10 symbols. It should be appreciated that, FIGS. 3B and 3C merely show two possible 12-port reference signal patterns, and it is able to acquire the other 12-port reference signal patterns on the basis of the above-mentioned distribution modes of the 12-port reference signal pattern, which will not be particularly defined herein.

To facilitate the description, in FIGS. 3B and 3C, each bock represents one RE, and a position of each RE may be represented by coordinates(x,y), where x represents a symbol number and y represents a subcarrier number. A numeric value in each box represents a port number.

FIG. 3B shows the patterns for three groups of 12-port CSI-RSs, and the patterns may be distributed in above-mentioned first distribution mode of the 12-port reference signal pattern.

The REs to which the first group of CSI-RSs have been mapped are located, depending on an order of the port number from 0 to 11, at the positions (2,9), (3,9), (2,3), (3,3), (2,8), (3,8), (2,2), (3,2), (5,6), (6,6), (5,0) and (6,0). The REs corresponding to the ports 0 to 7 are located at the positions acquired by moving three symbols forward the positions of the REs to which a group of CSI-RSs have been mapped in FIG. 1C, and the REs corresponding to the ports 8 to 11 are located at the positions acquired by moving four symbols forward the positions of the REs to which a group of CSI-RSs have been mapped in FIG. 1B.

The REs to which the second group of CSI-RSs have been mapped are located, depending on an order of the port number from 0 to 11, at the positions (5,11), (6,11), (5,5), (6,5), (5,10), (6,10), (5,4), (6,4), (5,7), (6,7), (5,1) and (6,1). The REs corresponding to the ports 0 to 7 are located at the positions acquired by moving three symbols forward the positions of the REs to which a group of CSI-RSs have been mapped in FIG. 1C, and the REs corresponding to the ports 8 to 11 are located at the positions acquired by moving four symbols forward the positions of the REs to which a group of CSI-RSs have been mapped in FIG. 1B.

The REs to which the third group of CSI-RSs have been mapped are located, depending on an order of the port number from 0 to 11, at the positions (9,9), (10,9), (9,3), (10,3), (9,8), (10,8), (9,2), (10,2), (5,9), (6,9), (5,3) and (6,3). The REs corresponding to the ports 0 to 7 are located at the positions acquired by moving three symbols forward the positions of the REs to which a group of CSI-RSs have been mapped in FIG. 1C, and the REs corresponding to the ports 8 to 11 are located at the positions acquired by moving four symbols forward the positions of the REs to which a group of CSI-RSs have been mapped in FIG. 1B.

FIG. 3C shows a pattern for a group of 12-port CSI-RSs. The REs corresponding to the ports 1 to 7 are located at the positions acquired by moving three symbols forward the positions of the REs to which a group of CSI-RSs have been mapped in FIG. 1C, and the REs corresponding to the ports 8 to 11 are located at the positions acquired by moving four symbols forward the positions of the REs to which a group of CSI-RSs have been mapped in FIG. 1B.

In FIG. 3A, 3B or 3C, every two ports may be multiplexed using a 2-bit orthogonal complementary code (OCC), e.g., in a mode as shown in Table 1.

TABLE 1

| CSI-RS port number | OCC | |
|---|---|---|
| 0, 4, 8, 10, 2, 6 | 1 | 1 |
| 1, 5, 9, 11, 3, 7 | 1 | −1 |

In Table 1, CSI-RS port 0 and CSI-RS port 1 may be multiplexed using a 2-bit OCC, CSI-RS port 4 and CSI-RS port 5 may be multiplexed using a 2-bit OCC, CSI-RS port 8 and CSI-RS port 9 may be multiplexed using a 2-bit OCC, CSI-RS port 10 and CSI-RS port 11 may be multiplexed using a 2-bit OCC, CSI-RS port 2 and CSI-RS port 3 may be multiplexed using a 2-bit OCC, and CSI-RS port 6 and CSI-RS port 7 may be multiplexed using a 2-bit OCC.

Second Embodiment

In this embodiment, a scheme for acquiring the 12-port reference signal pattern in accordance with the 8-port reference signal pattern will be described.

Figure 4A:
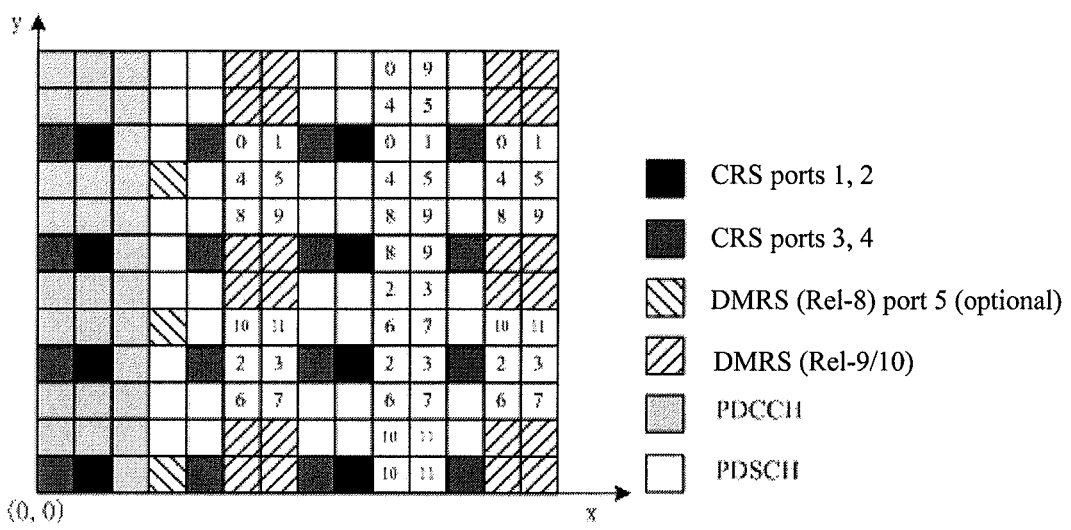
FIGS. 4A, 4B and 4C are schematic views showing the 12-port reference signal pattern according to the second embodiment of the present disclosure.

FIG. 4A shows a 12-port reference signal pattern. It should be appreciated that, FIG. 4A merely shows a possible 12-port reference signal pattern, and based on the above-mentioned distribution modes of the 12-port reference signal pattern, it is able to acquire the other 12-port reference signal patterns, which will not be particularly defined herein.

To facilitate the description, in FIG. 4A, each box may represent one RE, and a position of each RE may be represented by coordinates(x,y), where x represents a symbol number and y represents a subcarrier number. A numeric value in each box represents a port number.

As shown in FIG. 4A, the patterns for four groups of 12-port CSI-RSs are provided. The patterns for the first group of CSI-RSs and the pattern for the second group of CSI-RSs may be distributed in the above-mentioned second distribution mode of the 12-port reference signal pattern, and the patterns for the third group of CSI-RSs and the fourth group of CSI-RSs may be distributed in the above-mentioned fourth distribution mode of the 12-port reference signal pattern.

The REs to which the first group of CSI-RS have been mapped are located, depending on an order of the port number from 0 to 11, at the positions (5,9), (6,9), (5,3), (6,3), (5,8), (6,8), (5,2), (6,2), (5,7), (6,7), (5,4) and (6,4). The REs corresponding to the ports 0 to 7 are located at the positions identical to the REs to which a group of CSI-RSs have been mapped in FIG. 1C, and the REs corresponding to the ports 8 to 11 are the REs to which no reference signal has been mapped in FIG. 1C.

The REs to which the second group of CSI-RSs have been mapped are located, depending on an order of the port number from 0 to 11, at the positions (12,9), (13,9), (12,3), (13,3), (12,8), (13,8), (12,2), (13,2), (12,7), (13,7), (12,4) and (13,4). The REs corresponding to the ports 0 to 7 are located at the positions identical to the REs to which a group of CSI-RSs have been mapped in FIG. 1C, and the REs corresponding to the ports 8 to 11 are the REs to which no reference signal has been mapped in FIG. 1C.

The REs to which the third group of CSI-RSs have been mapped are located, depending on an order of the port number from 0 to 11, at the positions (9,12), (10,12), (9,5), (10,5), (9,11), (10,11), (9,4), (10,4), (9,7), (10,7), (9,1) and (10,1). The REs corresponding to the ports 0 to 7 are located at the positions identical to the REs to which a group of CSI-RSs have been mapped in FIG. 1C, and the REs corresponding to the ports 8 and 9 are located at the positions corresponding to two of the REs to which another group of CSI-RSs have been mapped in FIG. 1C, and the REs corresponding to the ports 10 and 11 are located at the positions identical to two of the REs to which yet another group of CSI-RSs have been mapped in FIG. 1C.

The REs to which the fourth group of CSI-RSs have been mapped are located, depending on an order of the port number from 0 to 11, at the positions (9,9), (10,9), (9,3), (10,3), (9,8), (10,8), (9,2), (10,2), (9,6), (10,6), (9,0) and (10,0). The REs corresponding to the ports 0 to 7 are located at the positions identical to the REs to which a group of CSI-RSs have been mapped in FIG. 1C, and the REs corresponding to the ports 8 and 9 are located at the positions corresponding to two of the REs to which another group of CSI-RSs have been mapped in FIG. 1C, and the REs corresponding to the ports 10 and 11 are located at the positions identical to two of the REs to which yet another group of CSI-RSs have been mapped in FIG. 1C.

In this embodiment, it is also able to acquire the 12-port reference signal pilot pattern in a DwPTS region of a TDD subframe on the basis of the above-mentioned principle.

Figure 4B:
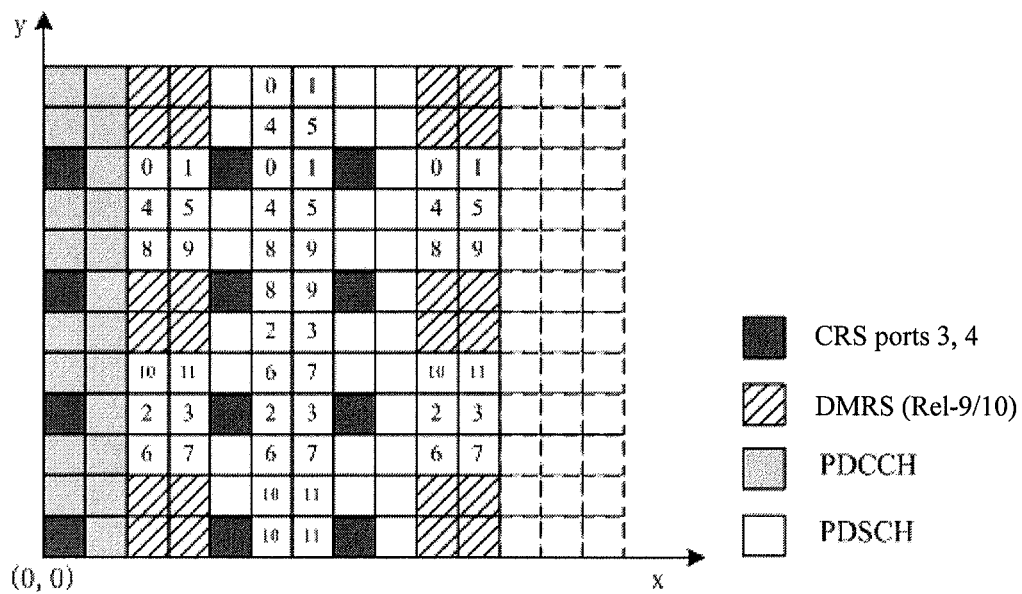
Figure 4C:
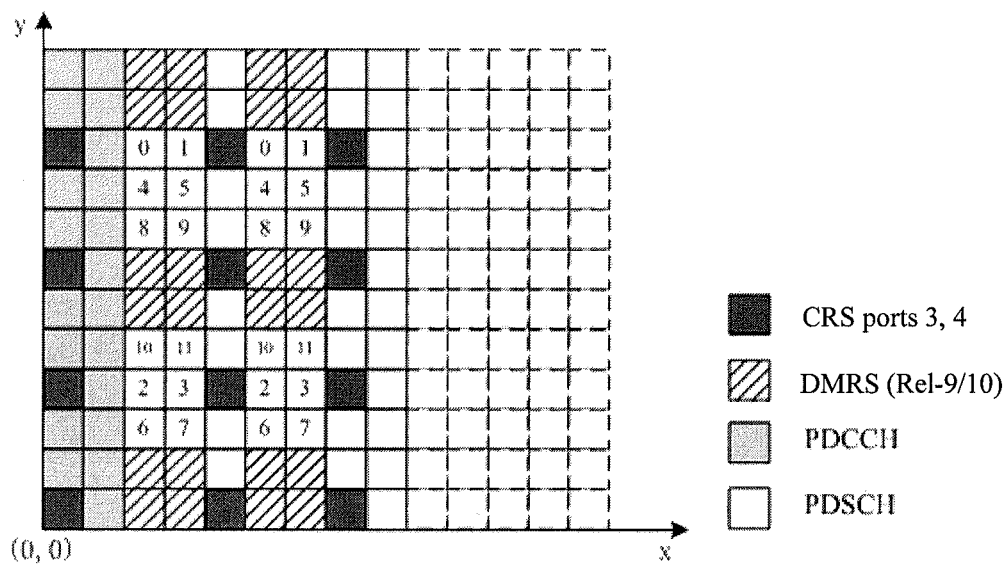

FIGS. 4B and 4C show 12-port reference signal patterns in DwPTSs respectively. The pattern in FIG. 4B may be adapted to a DwPTS having a length of 11 or 12 symbols, while the pattern in FIG. 4C may be adapted to a DwPTS having a length of 9 or 10 symbols. It should be appreciated that, FIGS. 4B and 4C merely show two possible 12-port reference signal patterns, and it is able to acquire the other 12-port reference signal patterns on the basis of the above-mentioned distribution modes of the 12-port reference signal pattern, which will not be particularly defined herein.

To facilitate the description, in FIGS. 4B and 4C, each bock represents one RE, and a position of each RE may be represented by coordinates(x,y), where x represents a symbol number and y represents a subcarrier number. A numeric value in each box represents a port number.

FIG. 4B shows the patterns for four groups of 12-port CSI-RSs.

The REs to which the first group of CSI-RSs have been mapped are located, depending on an order of the port number from 0 to 11, at the positions (2,9), (3,9), (2,3), (3,3), (2,8), (3,8), (2,2), (3,2), (2,7), (3,7), (2,4) and (3,4). The REs corresponding to the ports 0 to 7 are located at the positions acquired by moving three symbols forward the positions of the REs to which a group of CSI-RSs have been mapped in FIG. 1C, and frequency-domain positions of the REs corresponding to the ports 8 to 11 in symbol 2 and symbol 3 are identical to frequency-domain positions of the REs to which no reference signal has been mapped in symbol 5 and symbol 6 in FIG. 1C.

The REs to which the second group of CSI-RSs have been mapped are located, depending on an order of the port number from 0 to 11, at the positions (9,9), (10,9), (9,3), (10,3), (9,8), (10,8), (9,2), (10,2), (9,7), (10,7), (9,4) and (10,4). The REs corresponding to the ports 0 to 7 are located at the positions acquired by moving three symbols forward the positions of the REs to which a group of CSI-RSs have been mapped in FIG. 1C, and frequency-domain positions in symbol 9 and symbol 10 of the REs corresponding to the ports 8 to 11 are identical to frequency-domain positions of the REs to which no reference signal has been mapped in symbol 12 and symbol 13 in FIG. 1C.

The REs to which the third group of CSI-RSs have been mapped are located, depending on an order of the port number from 0 to 11, at the positions (5,11), (6,11), (5,5), (6,5), (5,10), (6,10), (5,4), (6,4), (5,7), (6,7), (5,1) and (6,1). The REs corresponding to the ports 0 to 7 are located at the positions acquired by moving three symbols forward the positions of the REs to which a group of CSI-RSs have been mapped in FIG. 1C, and the REs corresponding to the ports 8 to 11 are located at the positions acquired by moving four symbols forward the positions of the four REs to which another group of CSI-RSs have been mapped in FIG. 1C.

The REs to which the fourth group of CSI-RSs have been mapped are located, depending on an order of the port number from 0 to 11, at the positions (5,9), (6,9), (5,3), (6,3), (5,8), (6,8), (5,2), (6,2), (5,6), (6,6), (5,0) and (6,0). The REs corresponding to the ports 0 to 7 are located at the positions acquired by moving three symbols forward the positions of the REs to which a group of CSI-RSs have been mapped in FIG. 1C, and the REs corresponding to the ports 8 to 11 are located at the positions acquired by moving four symbols forward the positions of the four REs to which another group of CSI-RSs have been mapped in FIG. 1C.

FIG. 4C shows the patterns for two groups of 12-port CSI-RSs.

The REs to which the first group of CSI-RSs have been mapped are located, depending on an order of the port number from 0 to 11, at the positions (2,9), (3,9), (2,3), (3,3), (2,8), (3,8), (2,2), (3,2), (2,7), (3,7), (2,4) and (3,4). The REs corresponding to the ports 0 to 7 are located at the positions acquired by moving three symbols forward the positions of the REs to which a group of CSI-RSs have been mapped in FIG. 1C, and frequency-domain positions of the REs corresponding to the ports 8 to 11 in symbol 2 and symbol 3 are identical to frequency-domain positions of the REs to which no reference signal has been mapped in symbol 5 and symbol 6 in FIG. 1C.

The REs to which the second group of CSI-RSs have been mapped are located, depending on an order of the port number from 0 to 11, at the positions (5,9), (6,9), (5,3), (6,3), (5,8), (6,8), (5,2), (6,2), (5,7), (6,7), (5,4) and (6,4). The REs corresponding to the ports 0 to 7 are located at the positions acquired by moving seven symbols forward the positions of the REs to which a group of CSI-RSs have been mapped in FIG. 1C, and frequency-domain positions of the REs corresponding to the ports 8 to 11 in symbol 5 and symbol 6 are identical to frequency-domain positions of the REs to which no reference signal has been mapped in symbol 12 and symbol 13 in FIG. 1C.

In addition, in FIG. 4A, 4B or 4C, every two ports may be multiplexed using a 2-bit OCC, e.g., they may be multiplexed in a mode as shown in Table 1.

Third Embodiment

In this embodiment, another scheme for acquiring the 12-port reference signal pattern in accordance with the 8-port reference signal pattern will be described.

Figure 5A:
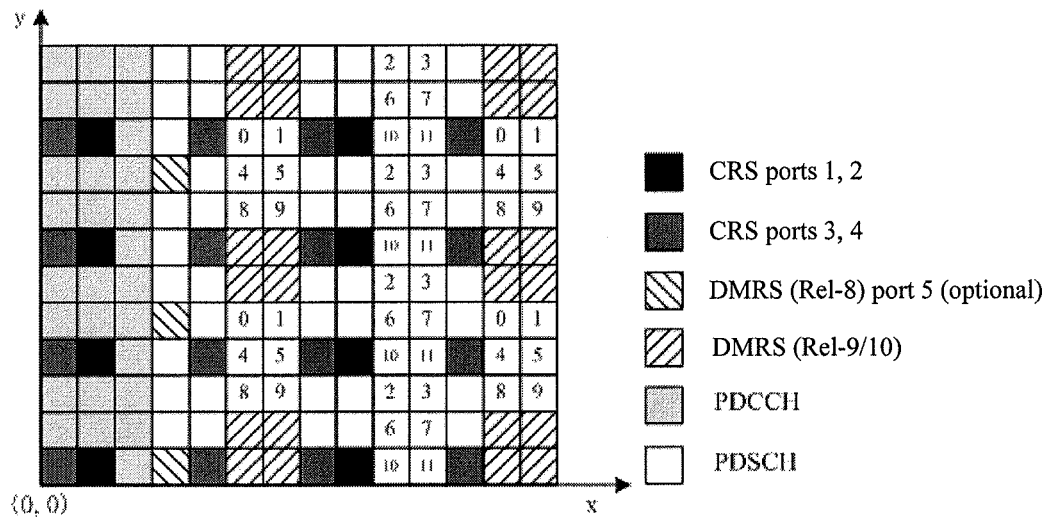
FIGS. 5A, 5B and 5C are schematic views showing the 12-port reference signal pattern according to the third embodiment of the present disclosure.

FIG. 5A shows a 12-port reference signal pattern. It should be appreciated that, FIG. 5A merely shows a possible 12-port reference signal pattern, and based on the above-mentioned distribution modes of the 12-port reference signal pattern, it is able to acquire the other 12-port reference signal patterns, which will not be particularly defined herein.

To facilitate the description, in FIG. 5A, each box may represent one RE, and a position of each RE may be represented by coordinates(x,y), where x represents a symbol number and y represents a subcarrier number. A numeric value in each box represents a port number.

As shown in FIG. 5A, the patterns for four groups of 12-port CSI-RSs are provided, and the four groups of 12-port CSI-RSs may be distributed in the above-mentioned sixth distribution mode.

The REs to which the first group of CSI-RSs have been mapped are located, depending on an order of the port number from 0 to 11, at the positions (5,9), (6,9), (9,11), (10,11), (5,8), (6,8), (9,10), (10,11), (5,7), (6,7), (9,10) and (10,9). The REs corresponding to the ports 0, 1, 4 and 5 are located at the positions identical to the REs to which a group of CSI-RSs have been mapped in FIG. 1C, the REs corresponding to the ports 2, 3, 6 and 7 are located at the positions identical to the REs to which another group of CSI-RSs have been mapped in FIG. 1C, the REs corresponding to the ports 10 and 11 are located at the positions identical to the REs to which yet another group of CSI-RSs have been mapped in FIG. 1C, and the REs corresponding to the ports 8 and 9 are the REs to which no reference signal has been mapped in FIG. 1C.

The REs to which the second, third and fourth groups of CSI-RSs have been mapped in the 12-port reference signal pattern may also conform to the above rule. The positions of the REs to which the second, third and fourth groups of CSI-RSs have been mapped will merely be given hereinafter. The REs to which the second group of CSI-RSs have been mapped are located, depending on an order of the port number from 0 to 11, at the positions (5,4), (6,4), (9,8), (10,8), (5,3), (6,3), (9,7), (10,7), (5,2), (6,2), (9,6) and (10,6). The REs to which the third group of CSI-RSs have been mapped are located, depending on an order of the port number from 0 to 11, at the positions (12,9), (13,9), (9,5), (10,5), (12,8), (13,8), (9,4), (10,4), (12,7), (13,7), (9,3) and (10,3). The REs to which the fourth group of CSI-RSs have been mapped are located, depending on an order of the port number from 0 to 11, at the positions (12,4), (13,4), (9,2), (10,2), (12,3), (13,3), (9,1), (10,1), (12,2), (13,2), (9,0) and (10,0).

In this embodiment, it is also able to acquire the 12-port reference signal pilot pattern in a DwPTS region of a TDD subframe on the basis of the above-mentioned principle.

Figure 5B:
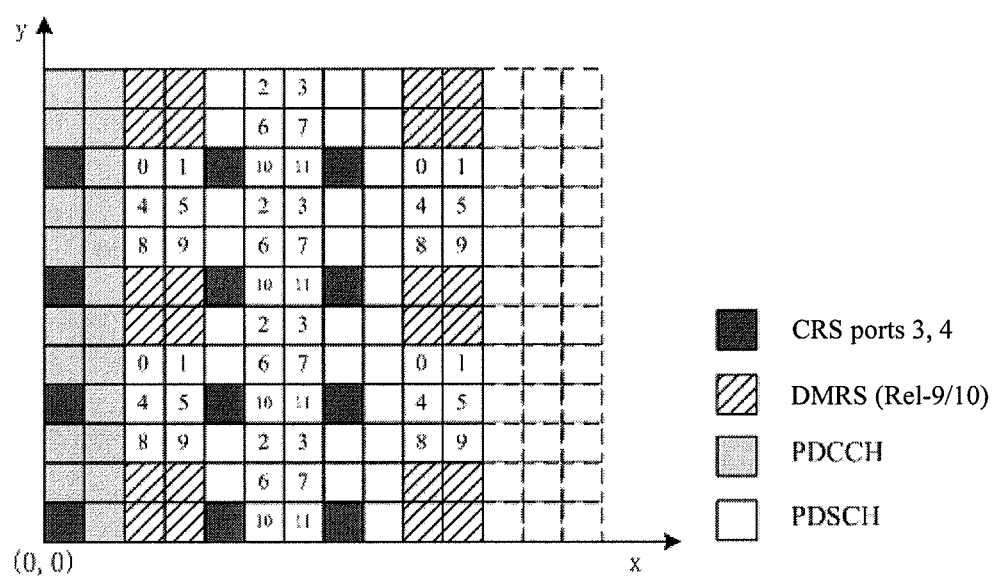
Figure 5C:
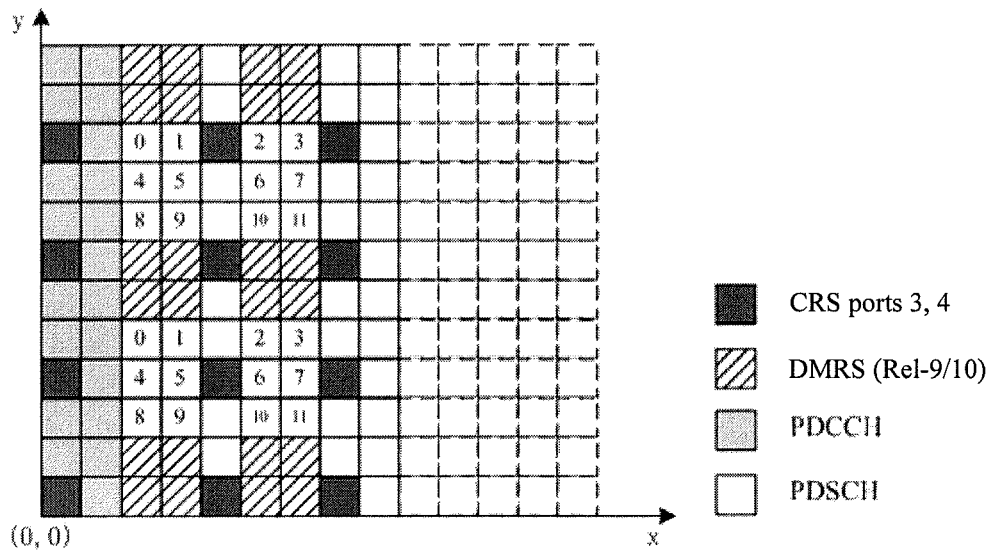

FIGS. 5B and 5C show 12-port reference signal patterns in DwPTSs respectively. The pattern in FIG. 5B may be adapted to a DwPTS having a length of 11 or 12 symbols, while the pattern in FIG. 5C may be adapted to a DwPTS having a length of 9 or 10 symbols. It should be appreciated that, FIGS. 5B and 5C merely show two possible J 2-port reference signal patterns, and it is able to acquire the other 12-port reference signal patterns on the basis of the above-mentioned distribution modes of the 12-port reference signal pattern, which will not be particularly defined herein.

To facilitate the description, in FIGS. 5B and 5C, each bock represents one RE, and a position of each RE may be represented by coordinates(x,y), where x represents a symbol number and y represents a subcarrier number. A numeric value in each box represents a port number.

FIG. 5B shows the pattern for four groups of 12-port CSI-RSs.

The REs to which the first group of CSI-RSs have been mapped are located, depending on an order of the port number from 0 to 11, at the positions (2,9), (3,9), (5,11), (6,11), (2,8), (3,8), (5,10), (6,10), (2,7), (3,7), (5,9) and (5,9). The REs corresponding to the ports 0, 1, 4 and 5 are located at the positions acquired by moving three symbols forward the positions of four of the REs to which a group of CSI-RSs have been mapped in FIG. 1C, the REs corresponding to the ports 2, 3, 6 and 7 are located at the positions acquired by moving four symbols forward the positions of four of the REs to which another group of CSI-RSs have been mapped in FIG. 1C, the REs corresponding to the ports 10 and 11 are located at the positions acquired by moving four symbols forward the positions of two of the REs to which a group of CSI-RSs have been mapped in FIG. 1C, and frequency-domain positions of the REs corresponding to the ports 8 and 9 in symbol 2 and symbol 3 are identical to frequency-domain positions of the REs to which no reference signal has been mapped in symbol 5 and symbol 6 in FIG. 1C.

The REs to which the second, third and fourth groups of CSI-RSs have been mapped in the 12-port reference signal pattern may also conform to the above rule. The positions of the REs to which the second, third and fourth groups of CSI-RSs have been mapped will merely be given hereinafter. The REs to which the second group of CSI-RSs have been mapped are located, depending on an order of the port number from 0 to 11, at the positions (2,4), (3,4), (5,8), (6,8), (2,3), (3,3), (5,7), (6,7), (2,2), (3,2), (5,6) and (5,6). The REs to which the third group of CSI-RSs have been mapped are located, depending on an order of the port number from 0 to 11, at the positions (9,9), (10,9), (5,5), (6,5), (9,8), (10,8), (5,4), (6,4), (9,7), (10,7), (5,3) and (6,3). The REs to which the fourth group of CSI-RSs have been mapped are located, depending on an order of the port number from 0 to 11, at the positions (9,4), (10,4), (5,2), (6,2), (9,3), (10,3), (5,1), (6,1), (9,2), (10,2), (5,0) and (6,0).

FIG. 5C shows the patterns for two groups of 12-port CSI-RSs.

The REs to which the first group of CSI-RSs have been mapped are located, depending on an order of the port number from 0 to 11, at the positions (2,9), (3,9), (5,9), (6,9), (2,8), (3,8), (5,8), (6,8), (2,7), (3,7), (5,7) and (6,7). The REs corresponding to the ports 0, 1, 4 and 5 are located at the positions acquired by moving three symbols forward the positions of four of the REs to which a group of CSI-RSs have been mapped in FIG. 1C, the REs corresponding to the ports 2, 3, 6 and 7 are located at the positions acquired by moving four symbols forward the positions of four of the REs to which another group of CSI-RSs have been mapped in FIG. 1C, the REs corresponding to the ports 10 and 11 are located at the positions acquired by moving four symbols forward the positions of two of the REs to which yet another group of CSI-RSs have been mapped in FIG. 1C, and frequency-domain positions of the REs corresponding to the ports 8 and 9 in symbol 2 and symbol 3 are identical to frequency-domain positions of the REs to which no reference signal has been mapped in symbol 5 and symbol 6 in FIG. 1C.

The REs to which the second groups of CSI-RS have been mapped in the 12-port reference signal pattern may also conform to the above rule. The positions of the REs to which the second group of CSI-RSs have been mapped will merely be given hereinafter. The REs to which the second group of CSI-RSs have been mapped are located, depending on an order of the port number from 0 to 11, at the positions (2,4), (3,4), (5,4), (6,4), (2,3), (3,3), (5,3), (6,3), (2,2), (3,2), (5,2) and (6,2).

In FIG. 5A, 5B or 5C, every four ports may be multiplexed using a 4-bit OCC, e.g., they may be multiplexed in a mode as shown in Table 2.

TABLE 2

| Port number | OCC | | | |
|---|---|---|---|---|
| 0, 4, 8 | 1 | 1 | 1 | 1 |
| 1, 5, 9 | 1 | 1 | −1 | −1 |
| 2, 6, 10 | 1 | −1 | 1 | −1 |
| 3, 7, 11 | −1 | 1 | 1 | −1 |

In Table 2, CSI-RS ports 0 to 3 may be multiplexed using a 4-bit OCC, CSI-RS ports 4 to 7 may be multiplexed using a 4-bit OCC, and CSI-RS ports 8 to 11 may be multiplexed using a 4-bit OCC.

In this embodiment, alternatively, two of the 12 ports may also be multiplexed using a 2-bit OCC, and four of the 12 ports may be multiplexed using a 4-bit OCC.

In this embodiment, alternatively, a group of 12 ports may be multiplexed using a 4-bit OCC, and another group of 12 ports may be multiplexed using a 2-bit OCC.

Four Embodiment

In this embodiment, yet another scheme for acquiring the 12-port reference signal pattern in accordance with the 8-port reference signal pattern will be described.

Figure 6A:
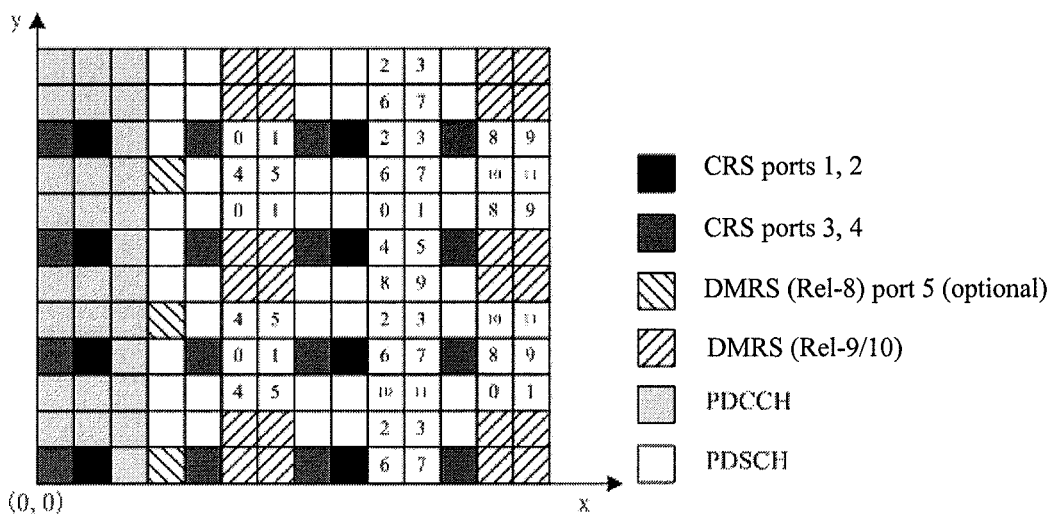
FIGS. 6A and 6B are schematic views showing the 12-port reference signal pattern according to the fourth embodiment of the present disclosure.

FIG. 6A shows a 12-port reference signal pattern. It should be appreciated that, FIG. 6A merely shows a possible 12-port reference signal pattern, and based on the above-mentioned distribution modes of the 12-port reference signal pattern, it is able to acquire the other 12-port reference signal patterns, which will not be particularly defined herein.

To facilitate the description, in FIG. 6A, each box may represent one RE, and a position of each RE may be represented by coordinates(x,y), where x represents a symbol number and y represents a subcarrier number. A numeric value in each box represents a port number.

As shown in FIG. 6A, the patterns for four groups of 12-port CSI-RSs are provided. The patterns for the first, second and third groups of CSI-RSs may be distributed in the above-mentioned seventh distribution mode of the 12-port reference signal pattern, and the pattern for the four groups of CSI-RSs may be distributed in the above-mentioned eighth distribution mode of the 12-port reference signal pattern.

The REs to which the first group of CSI-RS have been mapped are located, depending on an order of the port number from 0 to 11, at the positions (5,9), (6,9), (9,11), (10,11), (5,8), (6,8), (9,10), (10,11), (12,9), (13,9), (12,8) and (13,8). The REs corresponding to the ports 0, 1, 4 and 5 are located at the positions identical to the REs to which a group of CSI-RSs have been mapped in FIG. 1C, the REs corresponding to the ports 2, 3, 6 and 7 are located at the positions identical to the REs to which another group of CSI-RSs have been mapped in FIG. 1C, and the REs corresponding to the ports 8 to 11 are located at the positions identical to the REs to which yet another group of CSI-RSs have been mapped in FIG. 1C.

The REs to which the second group of CSI-RS have been mapped are located, depending on an order of the port number from 0 to 11, at the positions (5,3), (6,3), (9,1), (10,1), (5,2), (6,2), (9,0), (10,0), (12,3), (13,3), (12,2) and (13,2). The REs corresponding to the ports 0, 1, 4 and 5 are located at the positions identical to the REs to which a group of CSI-RSs have been mapped in FIG. 1C, the REs corresponding to the ports 2, 3, 6 and 7 are located at the positions identical to the REs to which another group of CSI-RSs have been mapped in FIG. 1C, and the REs corresponding to the ports 8 to 11 are located at the positions identical to the REs to which yet another group of CSI-RSs have been mapped in FIG. 1C.

The REs to which the third group of CSI-RS have been mapped are located, depending on an order of the port number from 0 to 11, at the positions (9,7), (10,7), (9,4), (10,4), (9,6), (10,6), (9,3), (10,3), (9,5), (10,5), (9,2) and (10,2). The REs corresponding to the ports 0, 1, 4 and 5 are located at the positions identical to the REs to which a group of CSI-RSs have been mapped in FIG. 1C, the REs corresponding to the ports 2, 3, 8 and 9 are located at the positions identical to the REs to which another group of CSI-RSs have been mapped in FIG. 1C, and the REs corresponding to the ports 7, 7, 10 and 11 are located at the positions identical to the REs to which yet another group of CSI-RSs have been mapped in FIG. 1C.

The REs to which the fourth group of CSI-RS have been mapped are located, depending on an order of the port number from 0 to 11, at the positions (5,7), (6,7), (9,9), (10,9), (5,4), (6,4), (9,8), (10,8), (12,7), (13,7), (12,4) and (13,4). The REs corresponding to the ports 2, 3, 6 and 7 are located at the positions identical to the REs to which a group of CSI-RSs have been mapped in FIG. 1C, and the REs corresponding to the other ports are REs to which no reference signal has been mapped in FIG. 1C.

In this embodiment, it is also able to acquire the 12-port reference signal pilot pattern in a DwPTS region of a TDD subframe on the basis of the above-mentioned principle.

Figure 6B:
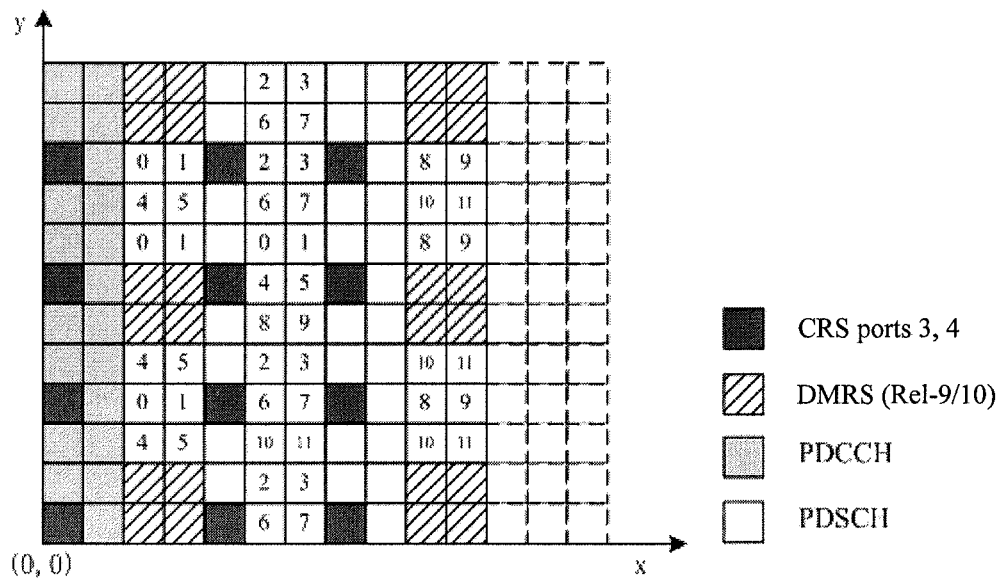

FIG. 6B shows a 12-port reference signal pattern in DwPTSs respectively. It should be appreciated that, FIG. 6B merely shows a possible 12-port reference signal pattern, and it is able to acquire the other 12-port reference signal patterns on the basis of the above-mentioned distribution modes of the 12-port reference signal pattern, which will not be particularly defined herein.

To facilitate the description, in FIG. 6B, each bock represents one RE, and a position of each RE may be represented by coordinates(x,y), where x represents a symbol number and y represents a subcarrier number. A numeric value in each box represents a port number.

FIG. 6B shows the patterns for four groups of 12-port CSI-RSs.

The REs to which the first group of CSI-RSs have been mapped are located, depending on an order of the port number from 0 to 11, at the positions (2,9), (3,9), (5,11), (6,11), (2,8), (3,8), (5,10), (6,10), (9,9), (10,9), (9,8) and (10,8). The REs corresponding to the ports 0, 1, 4 and 5 are located at the positions acquired by moving three symbols forward the positions of four of the REs to which a group of CSI-RSs have been mapped in FIG. 1C, the REs corresponding to the ports 2, 3, 6 and 7 are located at the positions acquired by moving four symbols forward the positions of four of the REs to which another group of CSI-RSs have been mapped in FIG. 1C, and the REs corresponding to the ports 8 to 11 are located at the positions acquired by moving three symbols forward the positions of two of the REs to which yet another group of CSI-RSs have been mapped in FIG. 1C.

The REs to which the second group of CSI-RSs have been mapped are located, depending on an order of the port number from 0 to 11, at the positions (2,3), (3,3), (5,1), (5,1), (2,2), (3,2), (5,0), (6,0), (12,3), (13,3), (12,2) and (13,2). The REs to which the third group of CSI-RSs have been mapped are located, depending on an order of the port number from 0 to 11, at the positions (5,7), (6,7), (5,4), (6,4), (5,6), (6,6), (5,3), (6,3), (5,5), (6,5), (5,2) and (6,2). The REs to which the fourth group of CSI-RSs have been mapped are located, depending on an order of the port number from 0 to 11, at the positions (2,7), (3,7), (5,9), (6,9), (2,4), (3,4), (5,8), (6,8), (9,7), (10,7), (9,4) and (10,4).

In FIG. 6A or 6B, the ports 0, 1, 2, 3, 8 and 9 corresponding to the first group of CSI-RSs may be multiplexed using a 6-bit OCC, and the ports 4, 5, 6, 7, 10 and 11 corresponding to the first group of CSI-RSs may be multiplexed using a 6-bit OCC. Alternatively, in this embodiment, a certain group of 12 ports may be multiplexed using a 6-bit OCC, and another group of 12 ports may be multiplexed using a 2-bit or 4-bit OCC.

Fifth Embodiment

In this embodiment, a scheme for acquiring the 16-port reference signal pattern in accordance with the 8-port reference signal pattern will be described.

FIGS. 7A, 7B, 7C and 7D show the 16-port reference signal patterns respectively. The patterns in FIGS. 7A and 7B may be adapted to a situation where a short Cyclic Prefix (CP) is used for symbol treatment, while the patterns in FIGS. 7C and 7D may be adapted to a situation where a long CP is used for symbol treatment. FIGS. 7A, 7B, 7C and 7D merely show some possible 12-port reference signal patterns, and it is able to acquire the other 12-port reference signal patterns on the basis of the above-mentioned distribution modes of the 12-port reference signal pattern, which will not be particularly defined herein.

To facilitate the description, in FIGS. 7A, 7B, 7C and 7D, each box may represent one RE, and a position of each RE may be represented by coordinates(x,y), where x represents a symbol number and y represents a subcarrier number. A numeric value in each box represents a port number.

Figure 7A:
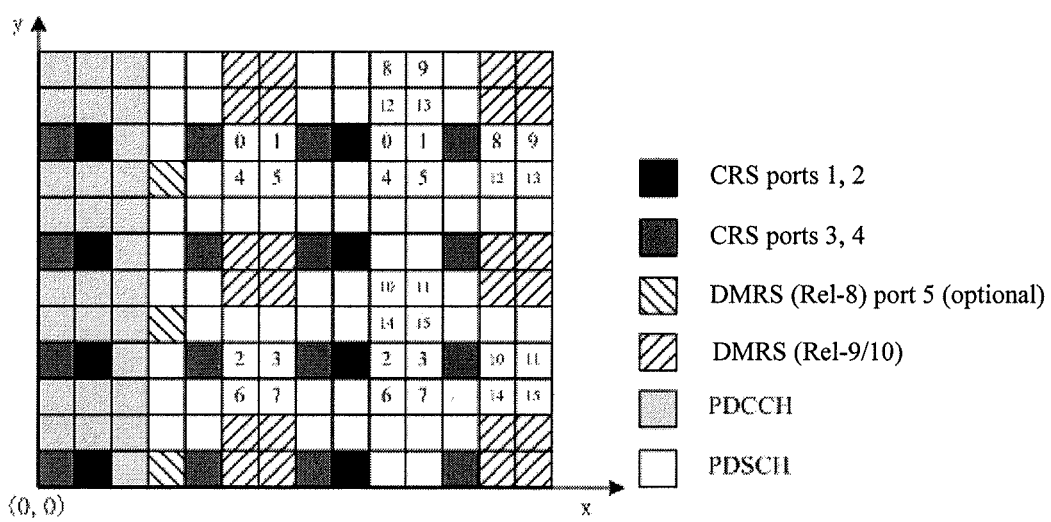
FIGS. 7A to 7F are schematic views showing a 16-port reference signal pattern according to the fifth embodiment of the present disclosure.

As shown in FIG. 7A, the patterns for two groups of 16-port CSI-RSs are provided.

The REs to which the first group of CSI-RSs have been mapped are located, depending on an order of the port number from 0 to 11, at the positions (5,9), (6,9), (5,3), (6,3), (5,8), (6,8), (5,2), (6,2), (9,11), (10,11), (9,5), (10,5), (9,10), (10,10), (9,4) and (10,4). The REs corresponding to the ports 0, 1, 4 and 5 are located at the positions identical to the REs to which a group of CSI-RSs have been mapped in FIG. 1C, the REs corresponding to the ports 2, 3, 6 and 7 are located at the positions identical to the REs to which another group of CSI-RSs have been mapped in FIG. 1C, the REs corresponding to the ports 8, 9, 12 and 13 are located at the positions identical to the REs to which yet another group of CSI-RSs have been mapped in FIG. 1C, and the REs corresponding to the other ports are located at the positions identical to the REs to which still yet another group of CSI-RSs have been mapped in FIG. 1C.

The REs to which the first group of CSI-RSs have been mapped are located, depending on an order of the port number from 0 to 11, at the positions (9,9), (10,9), (9,3), (9,3), (9,8), (9,8), (9,2), (9,2), (12,9), (13,9), (9,3), (10,3), (9,8), (10,8), (9,2) and (10,2). The REs corresponding to the ports 0, 1, 4 and 5 are located at the positions identical to the REs to which a group of CSI-RSs have been mapped in FIG. 1C, the REs corresponding to the ports 2, 3, 6 and 7 are located at the positions identical to the REs to which another group of CSI-RSs have been mapped in FIG. 1C, the REs corresponding to the ports 8, 9, 12 and 13 are located at the positions identical to the REs to which yet another group of CSI-RSs have been mapped in FIG. 1C, and the REs corresponding to the other ports are located at the positions identical to the REs to which still yet another group of CSI-RSs have been mapped in FIG. 1C.

Figure 7B:
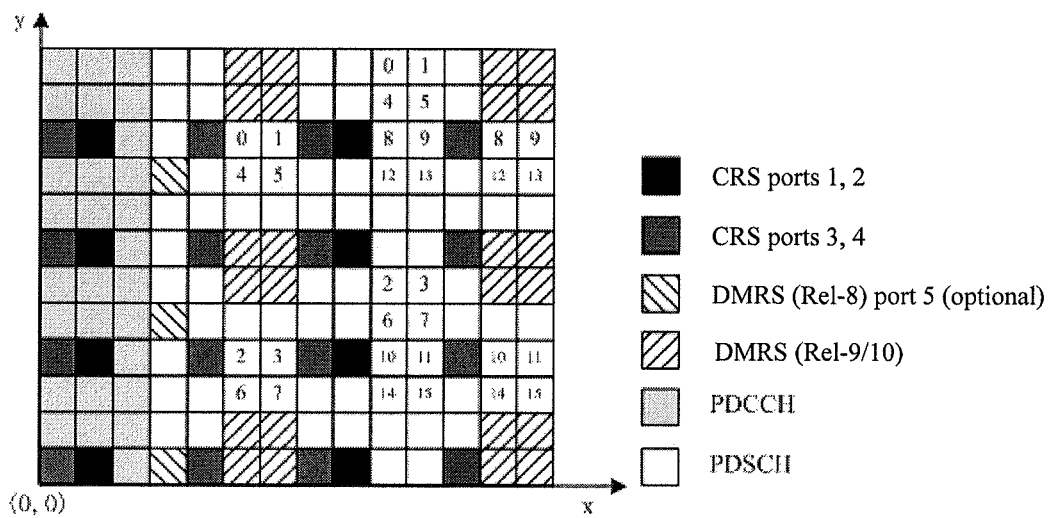

FIG. 7B shows the patterns for two groups of 16-port CSI-RSs. The REs to which the first group of CSI-RSs have been mapped are located, depending on an order of the port number from 0 to 11, at the positions (5,9), (6,9), (5,3), (6,3), (5,8), (6,8), (5,2), (6,2), (9,9), (10,9), (9,3), (10,3), (9,8), (10,8), (9,2) and (10,2). The REs to which the second group of CSI-RSs have been mapped are located, depending on an order of the port number from 0 to 11, at the positions (9,11), (10,11), (9,5), (10,5), (9,10), (10,10), (9,4), (10,4), (12,9), (13,9), (12,3), (13,3), (12,8), (13,8), (12,2) and (13,2).

Figure 7C:
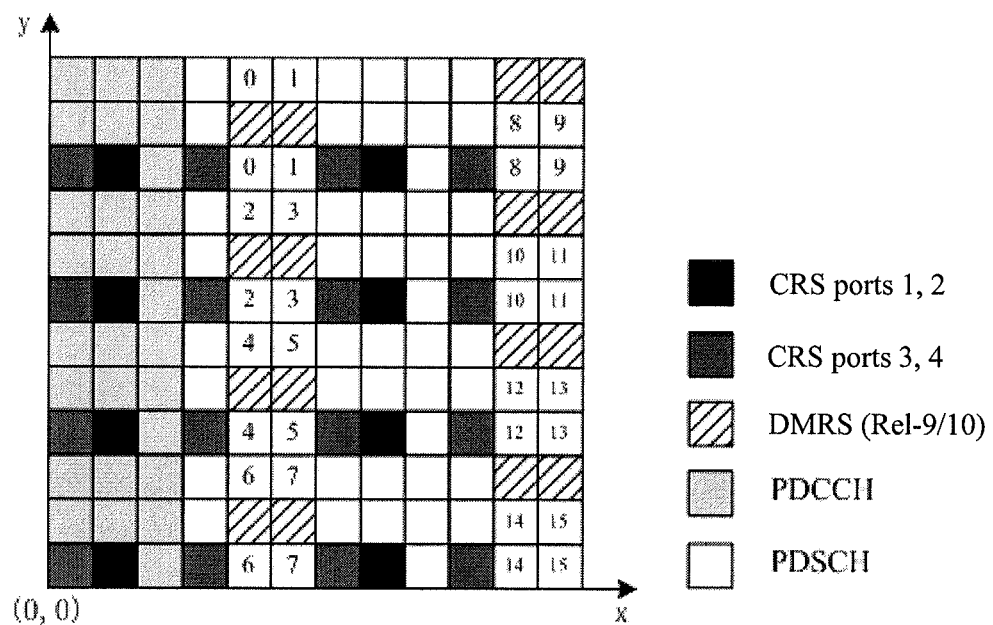

FIG. 7C shows the patterns for two groups of 16-port CSI-RSs. The REs to which the first group of CSI-RSs have been mapped are located, depending on an order of the port number from 0 to 11, at the positions (4,11), (5,11), (4,8), (5,8), (4,5), (5,6), (4,2), (5,2), (10,10), (11,10), (10,7), (11,7), (10,4), (11,4), (10,1) and (11,1). The REs to which the second group of CSI-RSs have been mapped are located, depending on an order of the port number from 0 to 11, at the positions (4,9), (5,9), (4,6), (5,6), (4,3), (5,3), (4,0), (5,0), (10,9), (11,9), (10,6), (11,6), (10,3), (11,3), (10,0) and (11,0).

Figure 7D:
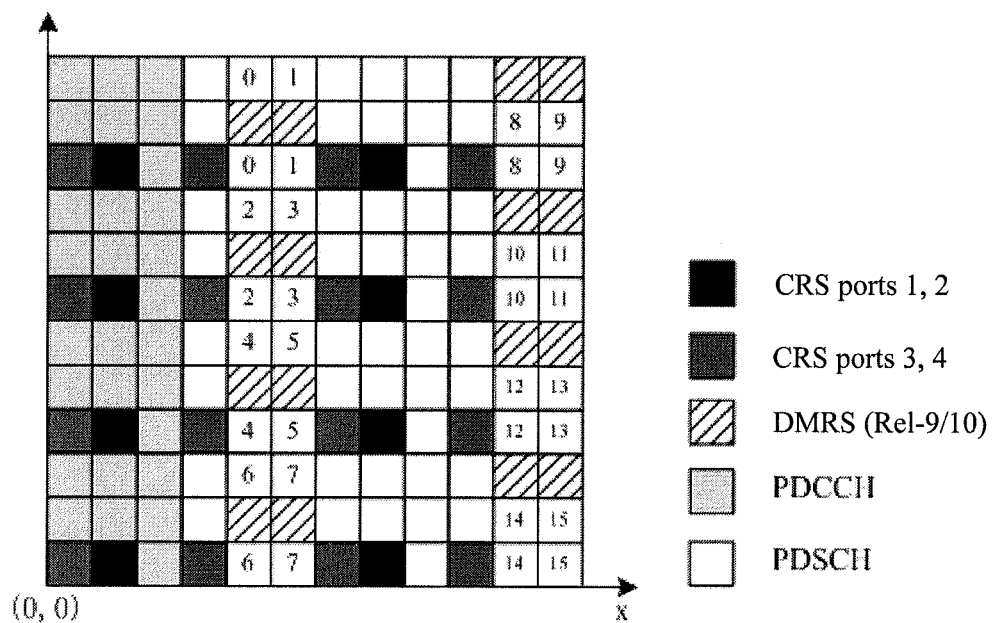

FIG. 7D shows the patterns for two groups of 16-port CSI-RSs. The REs to which the first group of CSI-RSs have been mapped are located, depending on an order of the port number from 0 to 11, at the positions (4,11), (5,11), (4,8), (5,8), (4,5), (5,6), (4,2), (5,2), (10,9), (11,9), (10,6), (11,6), (10,3), (11,3), (10,0) and (11,0). The REs to which the second group of CSI-RSs have been mapped are located, depending on an order of the port number from 0 to 11, at the positions (4,9), (5,9), (4,6), (5,6), (4,3), (5,3), (4,0), (5,0), (10,10), (11,10), (10,7), (11,7), (10,4), (11,4), (10,1) and (11,1).

In this embodiment, it is also able to acquire the 12-port reference signal pilot pattern in a DwPTS region of a TDD subframe on the basis of the above-mentioned principle.

Figure 7E:
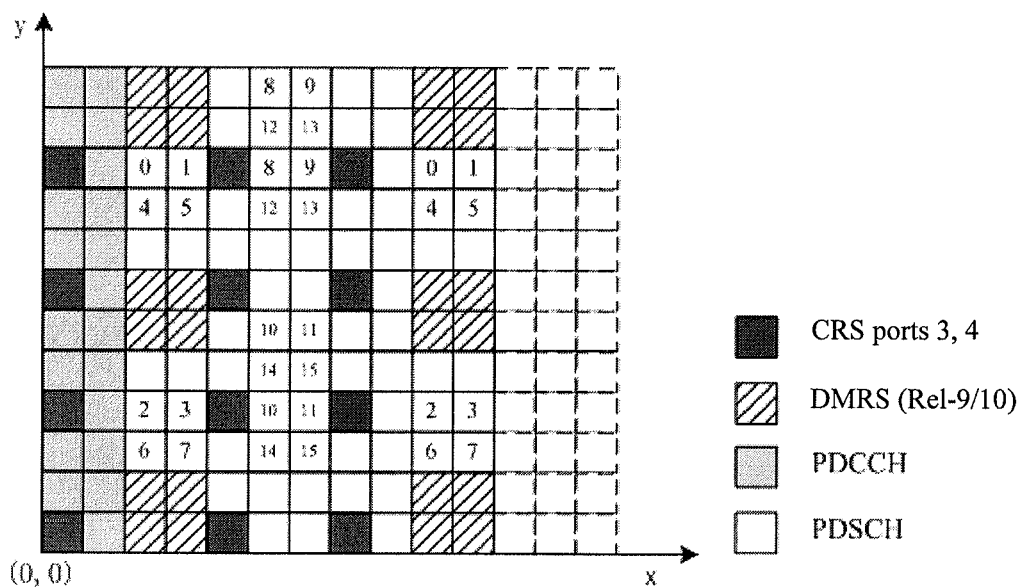
Figure 7F:
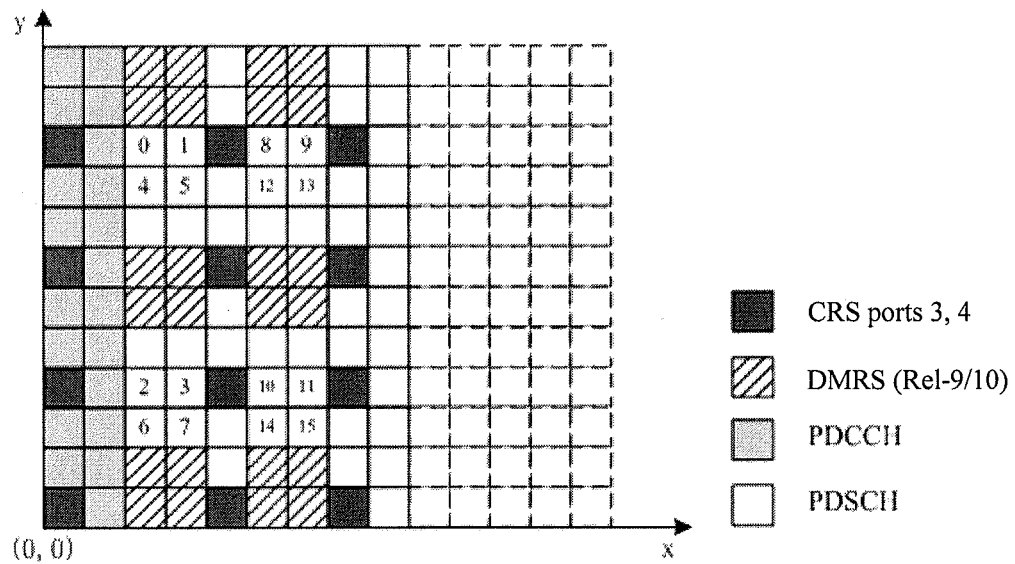

FIGS. 7E and 7F show the 16-port reference signal patterns in DwPTSs respectively. It should be appreciated that, FIG. 7E merely shows two possible 16-port reference signal patterns, and based on the above-mentioned distribution modes of the 16-port reference signal pattern, it is able to acquire the other 16-port reference signal patterns, which will not be particularly defined herein.

To facilitate the description, in FIGS. 7E and 7F, each box may represent one RE, and a position of each RE may be represented by coordinates(x,y), where x represents a symbol number and y represents a subcarrier number. A numeric value in each box represents a port number.

As shown in FIG. 7E, the patterns for two groups of 16-port CSI-RSs are provided. The REs to which the first group of CSI-RS have been mapped are located, depending on an order of the port number from 0 to 11, at the positions (2,9), (3,9), (2,3), (3,3), (2,8), (3,8), (5,2), (6,2), (5,11), (10,11), (5,5), (6,5), (5,10), (6,10), (5,4) and (6,4). The REs to which the second group of CSI-RS have been mapped are located, depending on an order of the port number from 0 to 11, at the positions (5,9), (6,9), (5,3), (6,3), (5,8), (6,8), (5,2), (6,2), (9,9), (10,9), (9,3), (10,3), (9,8), (10,8), (9,2) and (10,2).

As shown in FIG. 7F, the pattern for a group of 16-port CSI-RSs is provided. The REs to which the first group of CSI-RS have been mapped are located, depending on an order of the port number from 0 to 11, at the positions (2,9), (3,9), (2,3), (3,3), (2,8), (3,8), (2,2), (3,2), (5,9), (10,9), (5,3), (6,3), (5,8), (6,8), (5,2) and (6,2).

In FIGS. 7A to 7E, every two ports may be multiplexed using a 2-bit OCC, e.g., they may be multiplexed in a mode as shown in Table 3.

TABLE 3

| CSI-RS port number | OCC | |
|---|---|---|
| 0, 4, 2, 6, 8, 12, 10, 14 | 1 | 1 |
| 1, 5, 3, 7, 9, 13, 11, 15 | 1 | −1 |

In Table 3, CSI-RS ports 0 and 1 may be multiplexed using a 2-bit OCC, CSI-RS ports 4 and 5 may be multiplexed using a 2-bit OCC, CSI-RS ports 2 and 3 may be multiplexed using a 2-bit OCC, and so on.

Also, in FIGS. 7A to 7E, every four ports may be multiplexed using a 2-bit OCC, e.g., they may be multiplexed using a mode as shown in Table 4.

TABLE 4

| CSI-RS port number | OCC | | | |
|---|---|---|---|---|
| 0, 4, 2, 6 | 1 | 1 | 1 | 1 |
| 1, 5, 3, 7 | 1 | 1 | −1 | −1 |
| 8, 12, 10, 14 | 1 | −1 | 1 | −1 |
| 9, 13, 11, 15 | −1 | 1 | 1 | −1 |

In Table 4, the ports 0, 1, 8 and 9 may be multiplexed using a 4-bit OCC, the ports 4, 5, 12 and 13 may be multiplexed using a 4-bit OCC, the ports 2, 3, 10 and 11 may be multiplexed using a 4-bit OCC, and the ports 6, 7, 14 and 15 may be multiplexed using a 4-bit OCC.

In FIG. 7A, as compared with FIG. 1C, there are some REs to which no CSI-RS has been mapped. Of course, in this embodiment, the REs to which no CSI-RS has been mapped may be located at any other positions. Also, different combinations of the ports and different OCCs may be used. To be specific, two of the 16 ports may be multiplexed using a 2-bit OCC, and four of the 16 ports may be multiplexed using a 4-bit OCC. In addition, a certain group of 16 ports may be multiplexed using a 4-bit OCC, while another group of 16 ports may be multiplexed using a 2-bit OCC.

Figure 8:
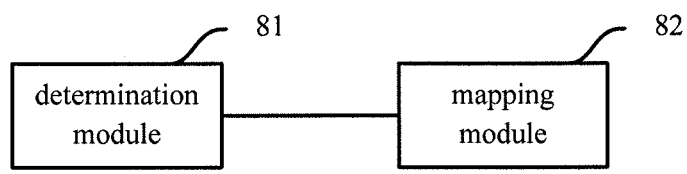
FIG. 8 is a schematic view showing a reference signal mapping device according to one embodiment of the present disclosure.

Based on an identical inventive concept, the present disclosure further provides in some embodiments a reference signal mapping device for implementing the above-mentioned reference signal mapping method. As shown in FIG. 8, the reference signal mapping device may include a determination module 81 and a mapping module 82. The determination module 81 is configured to determine a position of a RE to which a CSI-RS has been mapped in accordance with an N-port reference signal pattern. N is equal to 12 or 16, and the position of the RE to which the CSI-RS has been mapped in the N-port reference signal pattern is determined in accordance with a position of the RE to which the CSI-RS has been mapped in one or more of a 2-port reference signal pattern, a 4-port reference signal pattern and an 8-port reference signal pattern. The mapping module 82 is configured to perform a resource mapping operation on the CSI-RS in accordance with the determined position of the RE.

Preferably, positions of at least a part of N REs to which a group of CSI-RSs have been mapped in the N-port reference signal pattern are identical to positions of the REs to which one or more groups of CSI-RS have been mapped in the 8-port reference signal pattern.

Preferably, positions of eight REs of twelve REs to which a group of CSI-RSs have been mapped in the 12-port reference signal pattern are identical to positions of eight REs to which a first group of CSI-RSs have been mapped in the 8-port reference signal pattern, and the remaining four REs are distributed in one of the following five modes: a first distribution mode where the remaining four REs are located at positions identical to four REs to which a group of CSI-RSs have been mapped in the 4-port reference signal pattern; a second distribution mode where the remaining four REs are REs to which no reference signal has been mapped in the 8-port reference signal pattern; a third distribution mode where the remaining four REs are located at positions identical to four of the REs to which a second group of CSI-RSs have been mapped in the 8-port reference signal pattern; a fourth distribution mode where two of the remaining four REs are located at positions identical to two of eight REs to which the second group of CSI-RSs have been mapped in the 8-port reference signal pattern, and the other two of the remaining four REs are located at positions identical to two of eight REs to which a third group of CSI-RSs have been mapped in the 8-port reference signal pattern; and a fifth distribution mode where two of the remaining four REs are located at positions identical to two of the eight REs to which the second group of CSI-RS have been mapped in the 8-port reference signal pattern, and the other two of the remaining four REs are REs to which no reference signal has been mapped in the 8-port reference signal pattern.

In a possible embodiment of the present disclosure, positions of four REs of the twelve REs to which a group of CSI-RSs have been mapped in the 12-port reference signal pattern are identical to positions of four of the eight REs to which the first group of CSI-RSs have been mapped in the 8-port reference signal pattern, and the remaining eight REs are distributed in one of the following four modes: a sixth distribution mode where four of the remaining eight REs are located at positions identical to four of the eight REs to which the second group of CSI-RSs have been mapped in the 8-port reference signal pattern, two of the remaining four REs are located at positions identical to two of the eight REs to which the third group of CSI-RSs have been mapped in the 8-port reference signal pattern, and the other two of the remaining four REs are REs to which no reference signal has been mapped in the 8-port reference signal pattern; a seventh distribution mode where four of the remaining eight REs are located at positions identical to four of the eight REs to which the second group of CSI-RSs have been mapped in the 8-port reference signal pattern, and the other four of the remaining eight REs are located at positions identical to four of the eight REs to which the third group of CSI-RSs have been mapped in the 8-port reference signal pattern; an eighth distribution mode where four of the remaining eight REs are located at positions identical to four of the eight REs to which the second group of CSI-RSs have been mapped in the 8-port reference signal pattern, and the other four of the remaining eight REs are REs to which no reference signal has been mapped in the 8-port reference signal pattern; and a ninth distribution mode where the remaining eight REs are REs to which no reference signal has been mapped in the 8-port reference signal pattern.

Preferably, positions of eight REs of sixteen REs to which a group of CSI-RSs have been mapped in the 16-port reference signal pattern are identical to the positions of the eight REs to which the first group of CSI-RSs have been mapped in the 8-port reference signal pattern, and positions of the remaining eight REs are identical to the positions of the eight REs to which the second group of CSI-RSs have been mapped in the 8-port reference signal pattern.

Preferably, the N REs to which a group of CSI-RSs have been mapped in the N-port reference signal pattern are located in an identical column of symbols or in different columns of symbols, and each column of symbols contain two adjacent symbols.

Preferably, in the case that no DM-RS is to be transmitted, a part of the N REs to which a group of CSI-RSs have been mapped are mapped to a position of a RE to which the DM-RS has been mapped in accordance with the N-port reference signal pattern.

Preferably, in N ports corresponding to a group of CSI-RSs in the N-port reference signal pattern, at least two ports are multiplexed using a 2-bit orthogonal complementary code, or at least four ports are multiplexed using a 4-bit orthogonal complementary code, or at least six ports are multiplexed using a 6-bit orthogonal complementary code.

Preferably, the N-port reference signal pattern includes a DwPTS N-port reference signal pattern.

Figure 9:
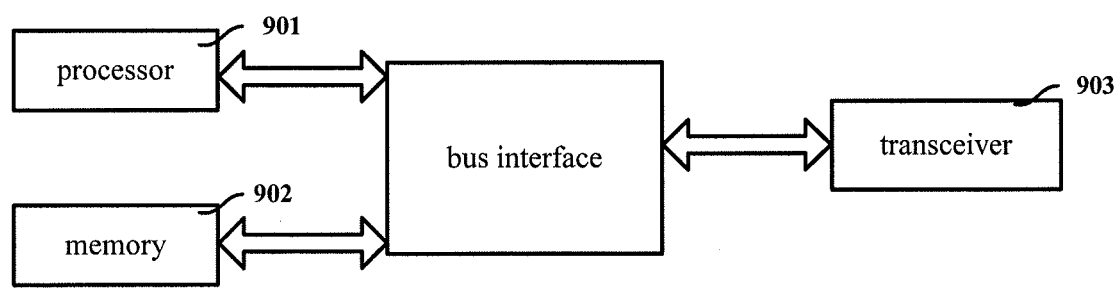
FIG. 9 is a schematic view showing a network side device (e.g., a base station) according to one embodiment of the present disclosure.

The present disclosure further provides in some embodiments a network side device (e.g., a base station) for implementing the above-mentioned reference signal mapping method. As shown in FIG. 9, the network side device may include a processor 901, a memory 902, a transceiver 903 and a bus interface. The processor 901 may take charge of managing bus architecture as well as general processings. The memory 902 may store therein data for the operation of the processor 901. The transceiver 903 is configured to receive and transmit data under the control of the processor 901.

In FIG. 9, the bus architecture may include a number of buses and bridges connected to each other, so as to connect various circuits for one or more processors such as the processor 901 and one or more memories such as the memory 902. In addition, as is known in the art, the bus architecture may be used to connect any other circuits, such as a circuit for a peripheral device, a circuit for a voltage stabilizer and a power management circuit, which are not further explained herein. Bus interfaces are provided, and the transceiver 903 may consist of a plurality of elements, i.e., a transmitter and a receiver for communication with any other devices over a transmission medium. The processor 901 may take charge of managing the bus architecture as well as general processings. The memory 902 may store data desired for the operation of the processor 901.

The data transmission procedure at a network side may be applied to, or implemented by, the processor 901. During the implementation, the steps in the data transmission procedure may be executed by an integrated logic circuit of hardware or software in the processor 901. The processor 901 may be a general-purpose processor, a Digital Signal Processor (DSP), an Application Specific Integrated Circuit (ASIC), a Field Programmable Gate Array (FPGA), or any other programmable logic element, discrete gate or transistor logic element, or discrete hardware assembly, so as to implement or execute the method, the steps and the procedures in the embodiments of the present disclosure. The general-purpose processor may be a microprocessor or any other conventional processor. The steps of the method in the embodiments of the present disclosure may be executed by the processor directly, or by the processor in combination with software modules. The software modules may be located in a known storage medium such as a Random Access Memory (RAM), a flash memory, a Read Only Memory (ROM), a Programmable Read Only Memory (PROM) or Electrically Erasable Programmable Read Only Memory (EEPROM), or a register. The storage medium may be located within the memory 902, and the processor 901 may read information stored in the memory 902, so as to implement the steps of the method in a control plane in combination with the hardware.

To be specific, the processor 901 is configured to read a program stored in the memory 902, so as to: determine a position of a RE to which a CSI-RS has been mapped in accordance with an N-port reference signal pattern, N being equal to 12 or 16, the position of the RE to which the CSI-RS has been mapped in the N-port reference signal pattern being determined in accordance with a position of the RE to which the CSI-RS has been mapped in one or more of a 2-port reference signal pattern, a 4-port reference signal pattern and an 8-port reference signal pattern; and perform a resource mapping operation on the CSI-RS in accordance with the determined position of the RE.

Preferably, positions of at least a part of N REs to which a group of CSI-RSs have been mapped in the N-port reference signal pattern are identical to positions of the REs to which one or more groups of CSI-RS have been mapped in the 8-port reference signal pattern.

Preferably, positions of eight REs of twelve REs to which a group of CSI-RSs have been mapped in the 12-port reference signal pattern are identical to positions of eight REs to which a first group of CSI-RSs have been mapped in the 8-port reference signal pattern, and the remaining four REs are distributed in one of the following five modes: a first distribution mode where the remaining four REs are located at positions identical to four REs to which a group of CSI-RSs have been mapped in the 4-port reference signal pattern; a second distribution mode where the remaining four REs are REs to which no reference signal has been mapped in the 8-port reference signal pattern; a third distribution mode where the remaining four REs are located at positions identical to four of the REs to which a second group of CSI-RSs have been mapped in the 8-port reference signal pattern; a fourth distribution mode where two of the remaining four REs are located at positions identical to two of eight REs to which the second group of CSI-RSs have been mapped in the 8-port reference signal pattern, and the other two of the remaining four REs are located at positions identical to two of eight REs to which a third group of CSI-RSs have been mapped in the 8-port reference signal pattern; and a fifth distribution mode where two of the remaining four REs are located at positions identical to two of the eight REs to which the second group of CSI-RS have been mapped in the 8-port reference signal pattern, and the other two of the remaining four REs are REs to which no reference signal has been mapped in the 8-port reference signal pattern.

In a possible embodiment of the present disclosure, positions of four REs of the twelve REs to which a group of CSI-RSs have been mapped in the 12-port reference signal pattern are identical to positions of four of the eight REs to which the first group of CSI-RSs have been mapped in the 8-port reference signal pattern, and the remaining eight REs are distributed in one of the following four modes: a sixth distribution mode where four of the remaining eight REs are located at positions identical to four of the eight REs to which the second group of CSI-RSs have been mapped in the 8-port reference signal pattern, two of the remaining four REs are located at positions identical to two of the eight REs to which the third group of CSI-RSs have been mapped in the 8-port reference signal pattern, and the other two of the remaining four REs are REs to which no reference signal has been mapped in the 8-port reference signal pattern; a seventh distribution mode where four of the remaining eight REs are located at positions identical to four of the eight REs to which the second group of CSI-RSs have been mapped in the 8-port reference signal pattern, and the other four of the remaining eight REs are located at positions identical to four of the eight REs to which the third group of CSI-RSs have been mapped in the 8-port reference signal pattern; an eighth distribution mode where four of the remaining eight REs are located at positions identical to four of the eight REs to which the second group of CSI-RSs have been mapped in the 8-port reference signal pattern, and the other four of the remaining eight REs are REs to which no reference signal has been mapped in the 8-port reference signal pattern; and a ninth distribution mode where the remaining eight REs are REs to which no reference signal has been mapped in the 8-port reference signal pattern.

Preferably, positions of eight REs of sixteen REs to which a group of CSI-RSs have been mapped in the 16-port reference signal pattern are identical to the positions of the eight REs to which the first group of CSI-RSs have been mapped in the 8-port reference signal pattern, and positions of the remaining eight REs are identical to the positions of the eight REs to which the second group of CSI-RSs have been mapped in the 8-port reference signal pattern.

Preferably, the N REs to which a group of CSI-RSs have been mapped in the N-port reference signal pattern are located in an identical column of symbols or in different columns of symbols, and each column of symbols contain two adjacent symbols.

Preferably, in the case that no DM-RS is to be transmitted, a part of the N REs to which a group of CSI-RSs have been mapped are mapped to a position of a RE to which the DM-RS has been mapped in accordance with the N-port reference signal pattern.

Preferably, in N ports corresponding to a group of CSI-RSs in the N-port reference signal pattern, at least two ports are multiplexed using a 2-bit orthogonal complementary code, or at least four ports are multiplexed using a 4-bit orthogonal complementary code, or at least six ports are multiplexed using a 6-bit orthogonal complementary code.

Preferably, the N-port reference signal pattern includes a DwPTS N-port reference signal pattern.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or another programmable data processing device may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Obviously, a person skilled in the art may make further modifications and improvements without departing from the spirit and the scope of the present disclosure, and these modifications and improvements shall also fall within the scope of the present disclosure.

What is claimed is:

1. A reference signal mapping method, comprising steps of:
   determining a position of a Resource Element (RE) to which a Channel State Information-Reference Signal (CSI-RS) has been mapped in accordance with an N-port reference signal pattern, N being equal to 12 or 16, the position of the RE to which the CSI-RS has been mapped in the N-port reference signal pattern being determined in accordance with a position of the RE to which the CSI-RS has been mapped in one or more of a 2-port reference signal pattern, a 4-port reference signal pattern and an 8-port reference signal pattern; and
   performing a resource mapping operation on the CSI-RS in accordance with the determined position of the RE,
   wherein positions of eight REs of twelve REs to which a group of CSI-RSs have been mapped in a 12-port reference signal pattern are identical to positions of eight REs to which a first group of CSI-RSs have been mapped in the 8-port reference signal pattern, and the remaining four REs are distributed in one of the following four modes:
   a second distribution mode where the remaining four REs are REs to which no reference signal has been mapped in the 8-port reference signal pattern;
   a third distribution mode where the remaining four REs are located at positions identical to four of the REs to which a second group of CSI-RSs have been mapped in the 8-port reference signal pattern; and
   a fifth distribution mode where two of the remaining four REs are located at positions identical to two of the eight REs to which the second group of CSI-RS have been mapped in the 8-port reference signal pattern, and the other two of the remaining four REs are REs to which no reference signal has been mapped in the 8-port reference signal pattern, or
   positions of four REs of the twelve REs to which a group of CSI-RSs have been mapped in the 12-port reference signal pattern are identical to positions of four of the eight REs to which the first group of CSI-RSs have been mapped in the 8-port reference signal pattern, and the remaining eight REs are distributed in one of the following four modes:
   a sixth distribution mode where four of the remaining eight REs are located at positions identical to four of the eight REs to which the second group of CSI-RSs have been mapped in the 8-port reference signal pattern, two of the remaining four REs are located at positions identical to two of the eight REs to which the third group of CSI-RSs have been mapped in the 8-port reference signal pattern, and the other two of the remaining four REs are REs to which no reference signal has been mapped in the 8-port reference signal pattern;
   a seventh distribution mode where four of the remaining eight REs are located at positions identical to four of the eight REs to which the second group of CSI-RSs have been mapped in the 8-port reference signal pattern, and the other four of the remaining eight REs are located at positions identical to four of the eight REs to which the third group of CSI-RSs have been mapped in the 8-port reference signal pattern;
   an eighth distribution mode where four of the remaining eight REs are located at positions identical to four of the eight REs to which the second group of CSI-RSs have been mapped in the 8-port reference signal pattern, and the other four of the remaining eight REs are REs to which no reference signal has been mapped in the 8-port reference signal pattern; and
   a ninth distribution mode where the remaining eight REs are REs to which no reference signal has been mapped in the 8-port reference signal pattern.

2. The reference signal mapping method according to claim 1, wherein positions of eight REs of sixteen REs to which a group of CSI-RSs have been mapped in a 16-port reference signal pattern are identical to the positions of the eight REs to which a first group of CSI-RSs have been mapped in the 8-port reference signal pattern, and positions of the remaining eight REs are identical to the positions of the eight REs to which a second group of CSI-RSs have been mapped in the 8-port reference signal pattern.

3. The reference signal mapping method according to claim 2, wherein the N REs to which a group of CSI-RSs have been mapped in the N-port reference signal pattern are located in an identical column of symbols or in different columns of symbols, and each column of symbols contain two adjacent symbols.

4. The reference signal mapping method according to claim 1, wherein the N REs to which a group of CSI-RSs have been mapped in the N-port reference signal pattern are located in an identical column of symbols or in different columns of symbols, and each column of symbols contain two adjacent symbols.

5. The reference signal mapping method according to claim 1, wherein in the case that no Demodulation-Reference Signal (DM-RS) is to be transmitted, a part of the N REs to which a group of CSI-RSs have been mapped are mapped to a position of a RE to which the DM-RS has been mapped in accordance with the N-port reference signal pattern.

6. The reference signal mapping method according to claim 1, wherein in N ports corresponding to a group of CSI-RSs in the N-port reference signal pattern, at least two ports are multiplexed using a 2-bit orthogonal complementary code, or at least four ports are multiplexed using a 4-bit orthogonal complementary code, or at least six ports are multiplexed using a 6-bit orthogonal complementary code.

7. The reference signal mapping method according to claim 6, wherein in the N-port reference signal pattern, every two ports are multiplexed using a 2-bit orthogonal complementary code, or every four ports are multiplexed using a 4-bit orthogonal complementary code, or every 6 ports are multiplexed using a 6-bit orthogonal complementary code.

8. The reference signal mapping method according to claim 1, wherein in the N-port reference signal pattern, the number of bits of an orthogonal complementary code used by N ports corresponding to a first group of CSI-RSs is identical to or different from the number of bits of an orthogonal complementary code used by N ports corresponding to a second group of CSI-RSs.

9. The reference signal mapping method according to claim 1, wherein the N-port reference signal pattern comprises a Downlink Pilot Timeslot (DwPTS) N-port reference signal pattern.

10. A reference signal mapping device, comprising a processor, a memory connected to the processor through a bus interface and configured to store therein programs and data for the operation of the processor, and a transceiver configured to communicate with any other devices over a transmission medium, wherein
the processor is configured to call and execute the programs and data stored in the memory, to enable the reference signal mapping device to:
determine a position of a Resource Element (RE) to which a Channel State Information-Reference Signal (CSI-RS) has been mapped in accordance with an N-port reference signal pattern, N being equal to 12 or 16, the position of the RE to which the CSI-RS has been mapped in the N-port reference signal pattern being determined in accordance with a position of the RE to which the CSI-RS has been mapped in one or more of a 2-port reference signal pattern, a 4-port reference signal pattern and an 8-port reference signal pattern; and
perform a resource mapping operation on the CSI-RS in accordance with the determined position of the RE,
wherein positions of eight REs of twelve REs to which a group of CSI-RSs have been mapped in a 12-port reference signal pattern are identical to positions of eight REs to which a first group of CSI-RSs have been mapped in the 8-port reference signal pattern, and the remaining four REs are distributed in one of the following four modes:
a second distribution mode where the remaining four REs are REs to which no reference signal has been mapped in the 8-port reference signal pattern;
a third distribution mode where the remaining four REs are located at positions identical to four of the REs to which a second group of CSI-RSs have been mapped in the 8-port reference signal pattern; and
a fifth distribution mode where two of the remaining four REs are located at positions identical to two of the eight REs to which the second group of CSI-RS have been mapped in the 8-port reference signal pattern, and the other two of the remaining four REs are REs to which no reference signal has been mapped in the 8-port reference signal pattern, or
positions of four REs of the twelve REs to which a group of CSI-RSs have been mapped in the 12-port reference signal pattern are identical to positions of four of the eight REs to which the first group of CSI-RSs have been mapped in the 8-port reference signal pattern, and the remaining eight REs are distributed in one of the following four modes:
a sixth distribution mode where four of the remaining eight REs are located at positions identical to four of the eight REs to which the second group of CSI-RSs have been mapped in the 8-port reference signal pattern, two of the remaining four REs are located at positions identical to two of the eight REs to which the third group of CSI-RSs have been mapped in the 8-port reference signal pattern, and the other two of the remaining four REs are REs to which no reference signal has been mapped in the 8-port reference signal pattern;
a seventh distribution mode where four of the remaining eight REs are located at positions identical to four of the eight REs to which the second group of CSI-RSs have been mapped in the 8-port reference signal pattern, and the other four of the remaining eight REs are located at positions identical to four of the eight REs to which the third group of CSI-RSs have been mapped in the 8-port reference signal pattern;
an eighth distribution mode where four of the remaining eight REs are located at positions identical to four of the eight REs to which the second group of CSI-RSs have been mapped in the 8-port reference signal pattern, and the other four of the remaining eight REs are REs to which no reference signal has been mapped in the 8-port reference signal pattern; and
a ninth distribution mode where the remaining eight REs are REs to which no reference signal has been mapped in the 8-port reference signal pattern.

11. The reference signal mapping device according to claim 10, wherein positions of eight REs of sixteen REs to which a group of CSI-RSs have been mapped in a 16-port reference signal pattern are identical to the positions of the eight REs to which a first group of CSI-RSs have been mapped in the 8-port reference signal pattern, and positions of the remaining eight REs are identical to the positions of the eight REs to which a second group of CSI-RSs have been mapped in the 8-port reference signal pattern.

12. The reference signal mapping device according to claim 10, wherein the N REs to which a group of CSI-RSs have been mapped in the N-port reference signal pattern are located in an identical column of symbols or in different columns of symbols, and each column of symbols contain two adjacent symbols.

13. The reference signal mapping device according to claim 10, wherein in the case that no Demodulation-Reference Signal (DM-RS) is to be transmitted, a part of the N REs to which a group of CSI-RSs have been mapped are mapped to a position of a RE to which the DM-RS has been mapped in accordance with the N-port reference signal pattern.

14. The reference signal mapping device according to claim 10, wherein in N ports corresponding to a group of CSI-RSs in the N-port reference signal pattern, at least two ports are multiplexed using a 2-bit orthogonal complementary code, or at least four ports are multiplexed using a 4-bit orthogonal complementary code, or at least six ports are multiplexed using a 6-bit orthogonal complementary code.

15. The reference signal mapping device according to claim 10, wherein the N-port reference signal pattern comprises a Downlink Pilot Timeslot (DwPTS) N-port reference signal pattern.

16. The reference signal mapping device according to claim 10, wherein the reference signal mapping device is a base station in a Long Term Evolution (LTE) system.

* * * * *